United States Patent
Yoo et al.

(10) Patent No.: US 12,538,028 B2
(45) Date of Patent: Jan. 27, 2026

(54) METHOD AND ELECTRONIC DEVICE FOR REDUCING THE PHYSICAL MOVEMENT TIME OF A CAMERA LENS BY PREEMPTIVELY MOVING THE LENS TO A PRESET POSITION

(71) Applicant: Samsung Electronics Co., Ltd., Suwon-si (KR)

(72) Inventors: Hyoungjin Yoo, Suwon-si (KR); Daejong Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 18/486,533

(22) Filed: Oct. 13, 2023

(65) Prior Publication Data
US 2024/0121512 A1   Apr. 11, 2024

Related U.S. Application Data

(63) Continuation of application No. PCT/KR2023/015346, filed on Oct. 5, 2023.

(30) Foreign Application Priority Data

Oct. 7, 2022 (KR) .................. 10-2022-0128974
Nov. 4, 2022 (KR) .................. 10-2022-0146283

(51) Int. Cl.
*H04N 23/69* (2023.01)
*H04N 23/63* (2023.01)

(52) U.S. Cl.
CPC ........... *H04N 23/69* (2023.01); *H04N 23/632* (2023.01)

(58) Field of Classification Search
CPC ...... H04N 23/69; H04N 23/632; H04N 23/55; H04N 23/90; G02B 7/10; G03B 3/10; G03B 5/00; G03B 13/36; G03B 17/12
See application file for complete search history.

(56) References Cited

U.S. PATENT DOCUMENTS 10,291,833 B2   5/2019   Kim et al.
10,764,504 B2   9/2020   Baek et al.
(Continued)

FOREIGN PATENT DOCUMENTS

JP    2002-072047 A    3/2002
JP    2014-038291 A    2/2014
(Continued)

OTHER PUBLICATIONS

International Search Report dated Jan. 11, 2024, issued in International Patent Application No. PCT/KR2023/015346.
(Continued)

*Primary Examiner* — Gevell V Selby
(74) *Attorney, Agent, or Firm* — Jefferson IP Law, LLP

(57) ABSTRACT

An electronic device is provided. The electronic device includes a first camera, a second camera including a lens moving within a movable range, a display, a processor, and a memory operatively connected to the processor. In response to the execution of a function related to the first camera, the electronic device may display a first preview image of a first magnification acquired through the first camera through the display. The processor may move the lens included in the second camera from a starting position to a preset first position configured based on the movable range of the lens while the first preview image of the first magnification is displayed. In response to an input requesting a zoom function to a second magnification, the processor may move the lens of the preset first position to a second position corresponding to the second magnification. The processor may acquire a second preview image corresponding to the second magnification through the second camera based on the lens moved to the second position.

20 Claims, 17 Drawing Sheets

(56) References Cited

U.S. PATENT DOCUMENTS

| | | |
|---|---|---|
| 10,768,345 B2 | 9/2020 | Moon et al. |
| 11,457,151 B2 * | 9/2022 | An ................... H04N 5/2628 |
| 2010/0149353 A1 | 6/2010 | Jang et al. |
| 2015/0062717 A1 | 3/2015 | Okawa et al. |
| 2017/0085764 A1 | 3/2017 | Kim et al. |
| 2018/0152623 A1 * | 5/2018 | Li ........................ H04N 5/2628 |
| 2018/0376122 A1 * | 12/2018 | Park ..................... H04N 5/2621 |
| 2019/0068886 A1 | 2/2019 | Baek et al. |
| 2019/0303708 A1 * | 10/2019 | Kim ...................... H04N 23/45 |
| 2020/0092486 A1 | 3/2020 | Guo et al. |
| 2022/0046151 A1 | 2/2022 | Shabtay et al. |
| 2022/0053133 A1 | 2/2022 | Wang et al. |
| 2022/0116540 A1 | 4/2022 | Jia |
| 2023/0164435 A1 | 5/2023 | Takahashi et al. |

FOREIGN PATENT DOCUMENTS

| | | |
|---|---|---|
| JP | 2020-122881 A | 8/2020 |
| JP | 2020-148841 A | 9/2020 |
| JP | 2021-019255 A | 2/2021 |
| KR | 10-2010-0067407 A | 6/2010 |
| KR | 10-2017-0035237 A | 3/2017 |
| KR | 10-2018-0029662 A | 3/2018 |
| KR | 10-2019-0021725 A | 3/2019 |
| KR | 10-2061461 B1 | 12/2019 |
| KR | 10-2020-0092580 A | 8/2020 |
| KR | 10-2022-0000948 A | 1/2022 |
| KR | 10-2348504 B1 | 1/2022 |
| WO | 2022/019137 A1 | 1/2022 |

OTHER PUBLICATIONS

European Search Report dated Sep. 2, 2025, issued in European Application No. 23875238.0.

* cited by examiner

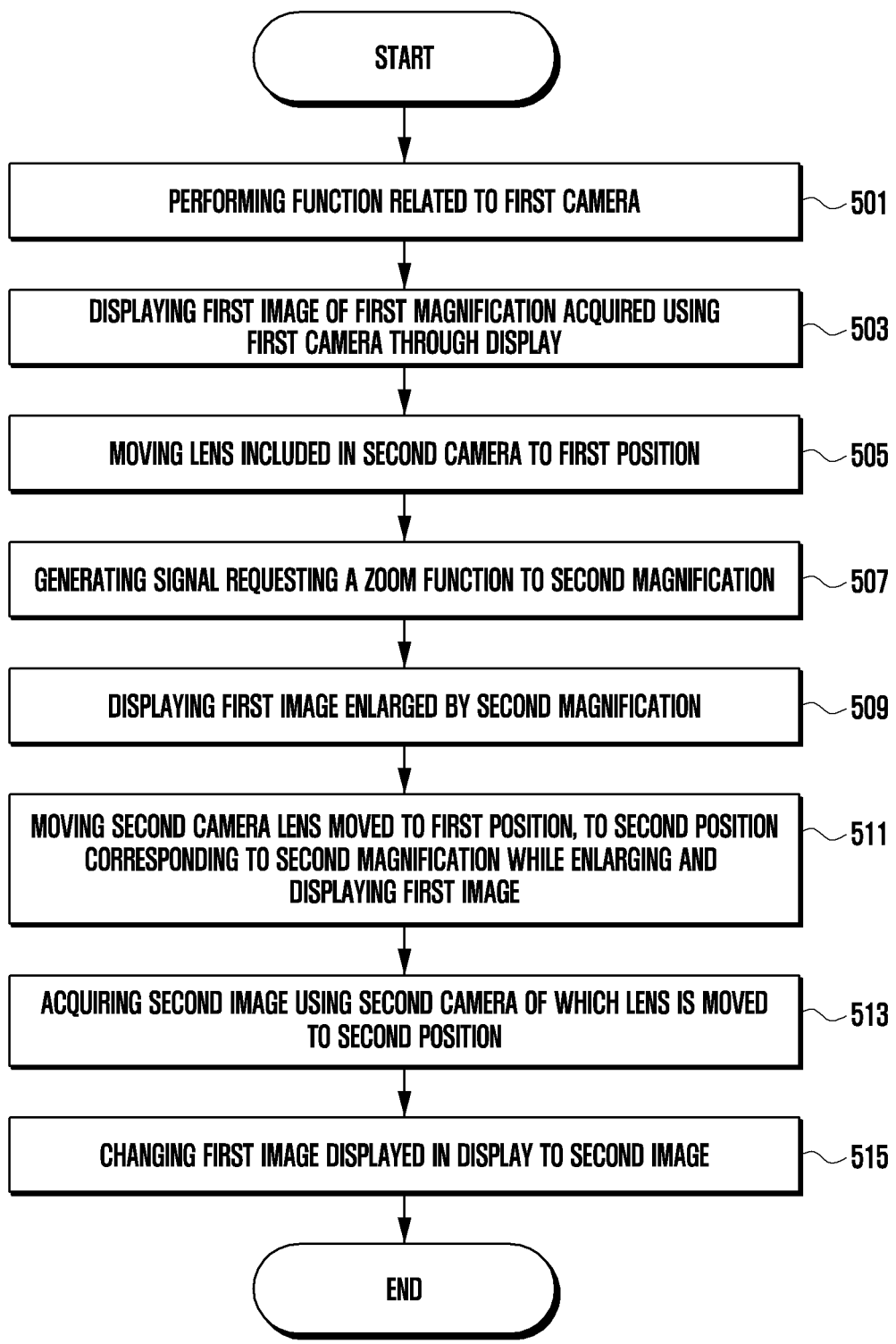

METHOD AND ELECTRONIC DEVICE FOR REDUCING THE PHYSICAL MOVEMENT TIME OF A CAMERA LENS BY PREEMPTIVELY MOVING THE LENS TO A PRESET POSITION

CROSS-REFERENCE TO RELATED APPLICATION(S)

This application is a continuation application, claiming priority under § 365(c), of an International application No. PCT/KR2023/015346, filed on Oct. 5, 2023, which is based on and claims the benefit of a Korean patent application number 10-2022-0128974, filed on Oct. 7, 2022, in the Korean Intellectual Property Office, and of a Korean patent application number 10-2022-0146283, filed on Nov. 4, 2022, in the Korean Intellectual Property Office, the disclosure of each of which is incorporated by reference herein in its entirety.

FIELD

The disclosure relates to a method and an electronic device for controlling a camera and performing a zoom function corresponding to a range of magnifications by moving the lens.

DESCRIPTION OF RELATED ART

Thanks to the remarkable development of information and communication technology and semiconductor technology, the spread and use of electronic devices is rapidly increasing. These electronic devices are not limited to their traditional inherent areas but are trending to provide various functions in convergence. For example, the electronic devices are equipped with a plurality of cameras to support zoom functions of various magnifications.

The electronic device may include a focal length fixed camera (e.g., an ultrawide camera, a wide camera, a tele camera) that supports a zoom function (e.g., a digital zoom function) of a specific magnification while the focal length is fixed, and an optical zoom camera (e.g., a continuous optical zoom camera) that supports a range of magnifications while the lens is physically moved. An electronic device equipped with a plurality of cameras may acquire at least one image by combining the zoom functions supported by each camera.

The disclosed information may be provided as a background technology for the purpose of aiding understanding of the disclosure. No assertion or determination is made regarding whether any of the disclosed subject matter could be applicable as a prior art with respect to the disclosure.

The above information is presented as background information only to assist with an understanding of the disclosure. No determination has been made, and no assertion is made, as to whether any of the above might be applicable as prior art with regard to the disclosure.

SUMMARY

In performing the zoom function of the focal length fixed camera and the continuous optical zoom camera, the speed of the zoom function is different. For example, a focal length fixed camera performs a zoom function (e.g., a digital zoom function) while the focal length is fixed, and in response to a zoom function request, it performs a digital zoom function that crops and enlarges at least a portion of an image. In comparison, a continuous optical zoom camera physically moves the lens in response to a zoom function request and perform a zoom function using the moved lens. Since the lens is physically moved by the lens to capture an image of a certain magnification, a continuous optical zoom camera can acquire relatively high-definition (e.g., high-quality) images than a camera with a fixed focal length. On the other hand, since a continuous optical zoom camera takes time to physically move the lens, it takes relatively longer for the zoom function to be completed than a focal length fixed camera.

An electronic device equipped with a focal length fixed camera and a continuous optical zoom camera causes discomfort to the user in displaying the image because the execution time is different according to the zoom function at a specific magnification.

Aspects of the disclosure are to address at least the above-mentioned problems and/or disadvantages and to provide at least the advantages described below. Accordingly, an aspect of the disclosure is to provide an electronic device intended to perform a zoom function reducing the user inconvenience while operating a focal length fixed camera and a continuous optical zoom camera together.

Additional aspects will be set forth in part in the description which follows and, in part, will be apparent from the description, or may be learned by practice of the presented embodiments.

In accordance with an aspect of the disclosure, an electronic device is provided. The electronic device may include a first camera, a second camera including a lens moving within a movable range, a display, a processor and a memory operatively connected to the processor and configured to store instructions. In response to the execution of a function related to the first camera, the processor may display a first preview image of a first magnification acquired through the first camera through the display. The processor may move the lens included in the second camera from a starting position to a preset first position configured based on the movable range of the lens while the first preview image of the first magnification is displayed. In response to an input requesting a zoom function to a second magnification, the processor may move the lens of the preset first position to a second position corresponding to the second magnification. The processor may acquire a second preview image corresponding to the second magnification through the second camera based on the lens moved to the second position.

In accordance with another aspect of the disclosure, a method of controlling a camera and performing a zoom function is provided. The method includes in response to the execution of a function related to the first camera, displaying the first preview image of the first magnification acquired through the first camera through the display; moving, while the first preview image of the first magnification is displayed, the lens included in the second camera from a starting position to the preset first position configured based on a movable range of the lens; moving, in response to an input requesting a zoom function to a second magnification, the lens of the preset first position to a second position corresponding to the second magnification; and acquiring a second preview image corresponding to the second magnification through the second camera based on the lens moved to the second position.

In accordance with another aspect of the disclosure, at least one non-transitory computer-readable storage medium (or a computer program product) for storing one or more programs is described. According to an embodiment of the disclosure, when executed by a processor of an electronic device, one or more programs includes instructions performing in response to the execution of a function related to the first camera, displaying the first preview image of the first magnification acquired through the first camera through the display; moving, while the first preview image of the first magnification is displayed, the lens included in the second camera from a starting position to the preset first position configured based on a movable range of the lens; moving, in response to an input requesting a zoom function to a second magnification, the lens of the preset first position to a second position corresponding to the second magnification; and acquiring a second preview image corresponding to the second magnification through the second camera based on the lens moved to the second position.

In an embodiment of the disclosure, the electronic device moves the lens to a predetermined position in response to the execution of a function related to the camera to reduce the time required for physical movement of the lens of the continuous optical zoom camera. For example, the electronic device moves the lens to a configured first position within the movable section of the lens. When the electronic device performs a zoom function at a specific magnification, the lens can be moved from the first position to the second position corresponding to a specific magnification, and the lens can be moved relatively quickly. According to an embodiment of the disclosure, the electronic device reduces the movement time (e.g., the movement distance) of the lens according to the zoom function in using a continuous optical zoom camera and quickly displays a high-definition image.

According to an embodiment of the disclosure, when performing a zoom function through a continuous optical zoom camera, the electronic device changes the position of the lens relatively quickly and acquire a relatively high-definition image using the lens at the changed position. After the movement of the lens is completed, the electronic device displays the acquired high-definition image through the display. The electronic device moves the lens relatively quickly and acquire a high-definition image relatively quickly using the lens at the changed position. According to an embodiment of the disclosure, the user's convenience according to the zoom function is improved by a high-definition image being quickly acquired and displayed.

Effects obtainable in the disclosure are not limited to the aforementioned effects, and other effects not mentioned may be easily understood from the following description by a person having ordinary knowledge in the art to which the disclosure pertains.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 5 is a flowchart illustrating a method of performing a zoom function using different types of cameras according to an embodiment of the disclosure;

Throughout the drawings, it should be noted that like reference numbers are used to depict the same or similar elements, features, and structures.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
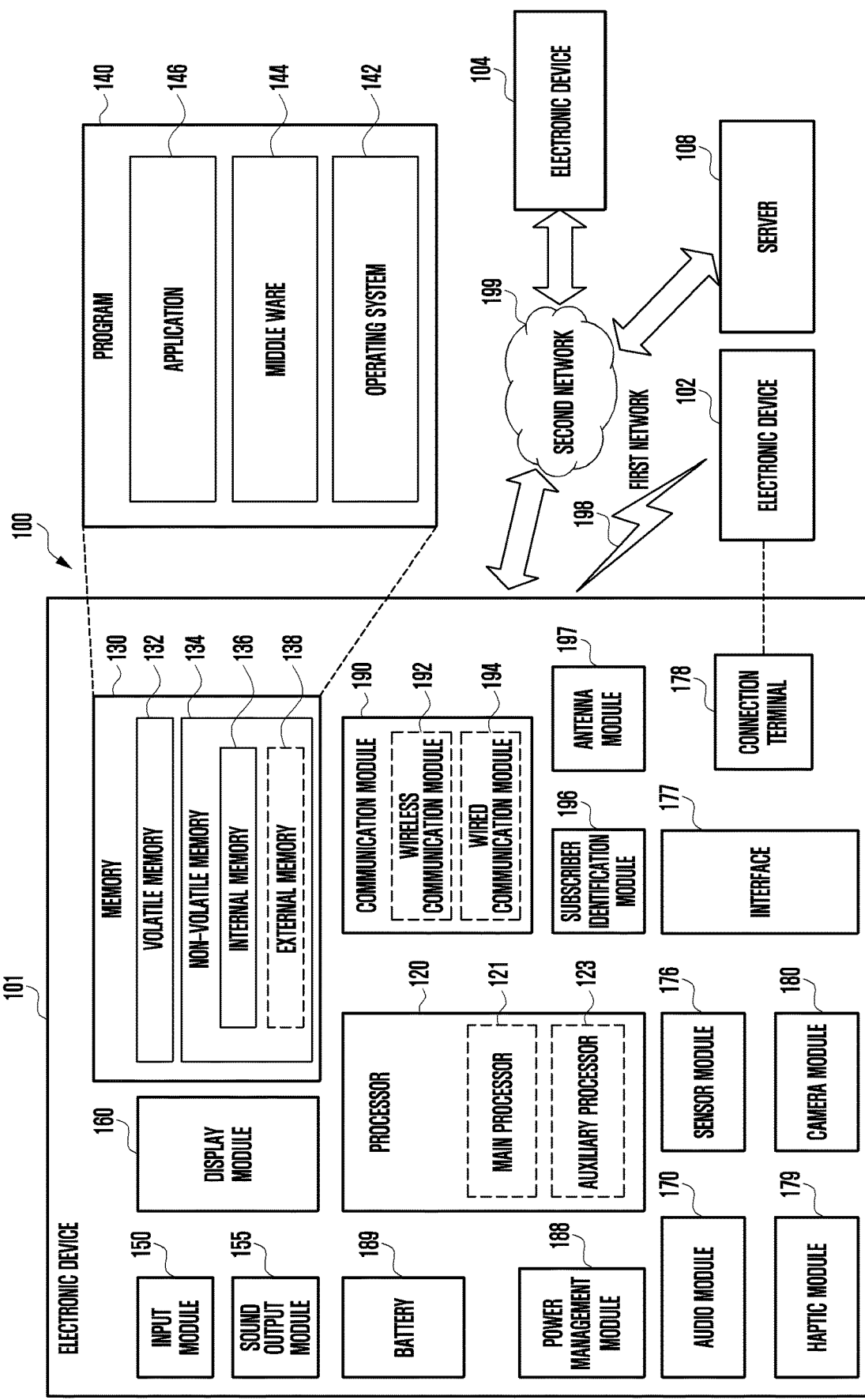
FIG. 1 is a block diagram of an electronic device in a network environment according to an embodiment of the disclosure.

FIG. 1 illustrates an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 includes a processor 120, a memory 130, an input module 150, an audio output module 155, a display module 160, an audio module 170, a sensor module 176, an interface 177, a connecting terminal 178, a haptic module 179, a camera module 180, a power management module 188, a battery 189, a communication module 190, a subscriber identity module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record. The receiver may be used for receiving incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include a touch sensor adapted to detect a touch, or a pressure sensor adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the external electronic device 102). The connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC))

other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2A:
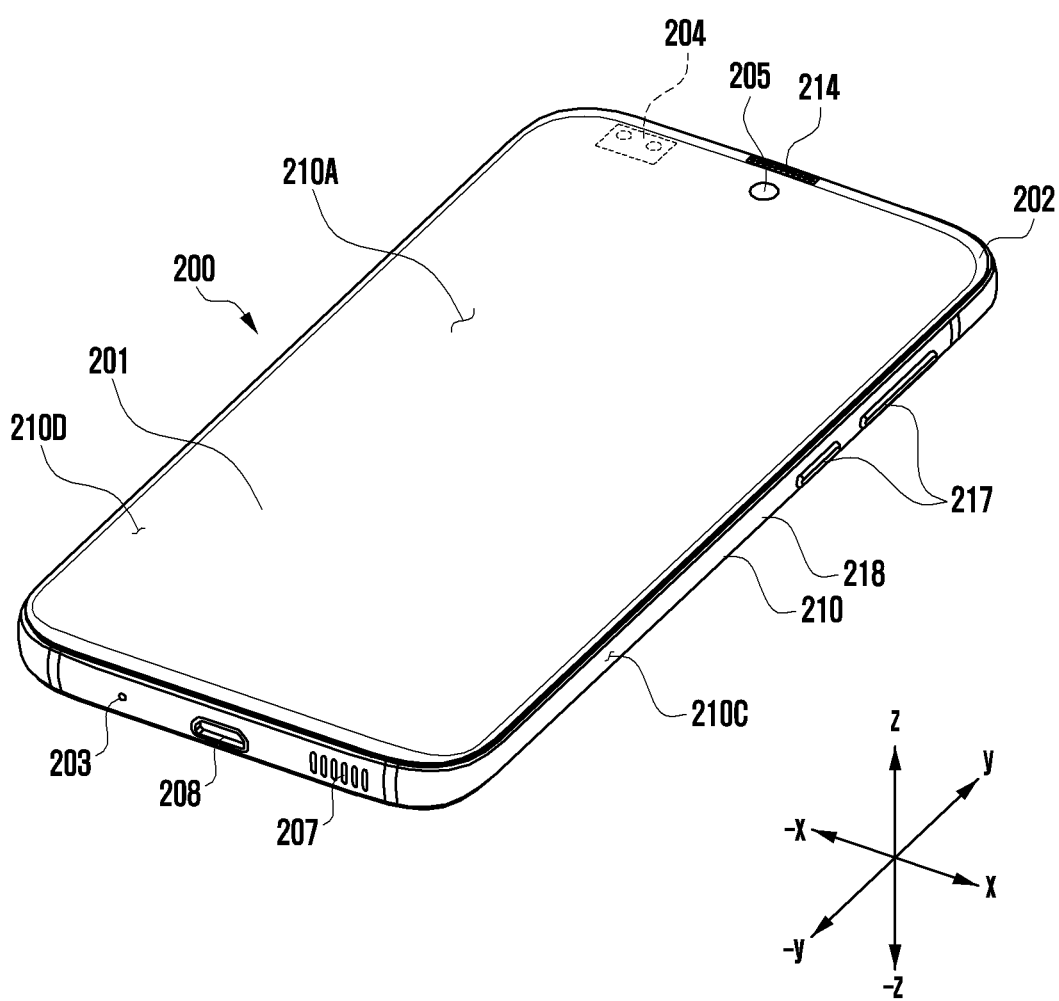
FIG. 2A is a perspective view of a front surface of an electronic device according to an embodiment of the disclosure.
Figure 2B:
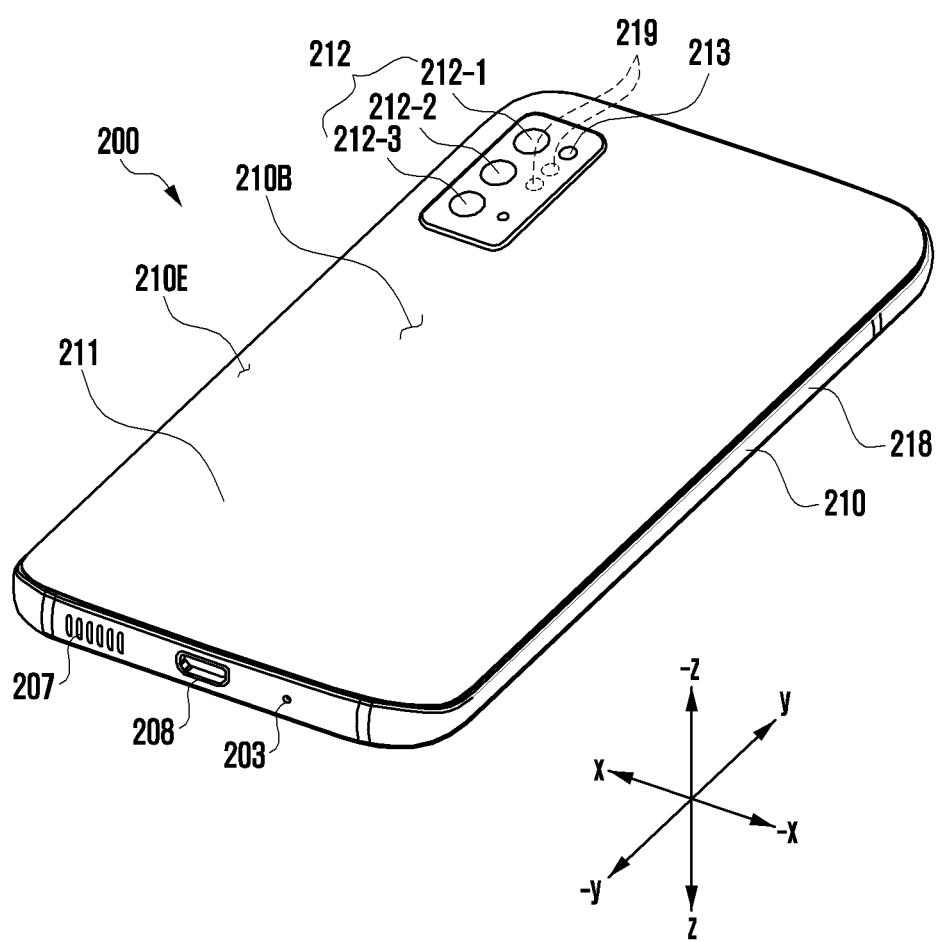
FIG. 2B is a perspective view of a rear surface of an electronic device of FIG. 2A according to an embodiment of the disclosure.

FIG. 2A is a perspective view of a front surface of an electronic device according to an embodiment of the disclosure. FIG. 2B is a perspective view of a rear surface of the electronic device of FIG. 2A according to an embodiment of the disclosure.

Referring to FIGS. 2A and 2B, an electronic device 200 may be at least partially similar to the electronic device 101 of FIG. 1 or may include other embodiments of the electronic device.

Referring to FIGS. 2A and 2B, the electronic device 200 (e.g., the electronic device 101 of FIG. 1) according to an embodiment may include a housing 210 including the first surface (or the front surface) 210*a*, the second surface (or the rear surface) 210*b*, and the side surface 210*c* surrounding the space between the first surface 210*a* and the second surface 210*b*. In another embodiment of the disclosure (not shown), the housing 210 may refer to a structure forming a portion of the first surface 210*a*, the second surface 210*b*, and the side surface 210*c* of FIGS. 2A and 2B. According to an embodiment of the disclosure, the first surface 210*a* may be formed by at least a partially transparent front plate 202 (e.g., a glass plate or a polymer plate comprising various coating layers). The second surface 210*b* may be formed by a substantially opaque rear plate 211. The rear plate 211 may be formed, for example, by a coated or colored glass, a ceramic, a polymer, a metal (e.g., an aluminum, a stainless steel (STS), or a magnesium), or a combination of at least two of the above materials. The side surface 210*c* may be coupled with the front plate 202 and the rear plate 211 and may be formed by a side bezel structure (or the "lateral member") 218 including a metal and/or a polymer. In some embodiments of the disclosure, the rear plate 211 and the side bezel structure 218 may be integrally formed and may contain the same material (e.g., a metal material, such as an aluminum).

In the illustrated embodiment of the disclosure, the front plate 202 may include a seamlessly extended first area 210*d* that is curved from the first surface 210*a* to the rear plate 211 to include both ends of the long edge of the front plate 202. In the illustrated embodiment of the disclosure (e.g., refer to FIG. 2B), the rear plate 211 may include a second area 210*e* curved from the second surface 210*b* to the front plate 202 and extended seamlessly. In some embodiments of the disclosure, the front plate 202 or the rear plate 211 may include only one of the first area 210*d* or the second area 210*e*. In some embodiments of the disclosure, the front plate 202 may not include the first area 210*d* and the second area 210*e* but may include only a flat plane parallel to the second surface 210*b*. In the embodiment of the disclosure s, when viewed from the side of the electronic device 200, the side bezel structure 218 may have a first thickness (or width) on the side surface that does not include the first area 210*d* or the second area 210*e* as described above, and it may have a second thickness thinner than the first thickness on the side surface that includes the first area or the second area.

According to an embodiment of the disclosure, the electronic device 200 may include at least one of a display 201 (e.g., the display module 160 of FIG. 1), an input device 203 (e.g., the input module 150 of FIG. 1), a sound output device 207 and 214 (e.g., the sound output module 155 of FIG. 1), the sensor module 204 and 219 (e.g., the sensor module 176 of FIG. 1), the camera module 205, 212, and 213 (e.g., the camera module 180 of FIG. 1), a key input device 217, an indicator (not shown) (e.g., an interface 177 of FIG. 1), and a connector 208 (e.g., a connection terminal 178 of FIG. 1). In some embodiments of the disclosure, the electronic device 200 may omit at least one of the components (e.g., a key input device 217 or an indicator) or may additionally include other components.

According to an embodiment of the disclosure, the display 201 may be exposed, for example, through a substantial portion of the front plate 202. In some embodiments of the disclosure, at least a portion of the display 201 may be exposed through the first surface 210*a* and the front plate 202 forming the first area 210*d* of the side surface 210*c*. The display 201 may be disposed by being combined with or adjacent to a touch sensing circuit, a pressure sensor capable of measuring the intensity (e.g., the pressure) of the touch, and/or a digitizer detecting a stylus pen of a magnetic field type. In some embodiments of the disclosure, at least a portion of the sensor modules 204 and 219 and/or at least a portion of the key input device 217 may be disposed in the first area 210d and/or the second area 210e.

The input device 203 may include a microphone 203. In some embodiments of the disclosure, the input device 203 may include a plurality of microphones 203 disposed to detect the direction of sound. The sound output devices 207 and 214 may include speakers 207 and 214. The speakers 207 and 214 may include an external speaker 207 and a call receiver 214. In some embodiments of the disclosure, the microphone 203, speakers 207 and 214, and connector 208 may be disposed in the space above the electronic device 200 and may be exposed to the external environment through at least one hole formed in the housing 210. In some embodiments of the disclosure, the holes formed in the housing 210 may be used in common for microphone 203 and speakers 207 and 214. In some embodiments of the disclosure, the sound output devices 207 and 214 may include a speaker (e.g., piezo speaker) operating while excluding the hole formed in the housing 210.

The sensor modules 204 and 219 may generate an electrical signal or data value corresponding to the internal operating state of the electronic device 200 or an external environmental state. The sensor modules 204 and 219 may include, for example, a first sensor module 204 (e.g., a proximity sensor, an optical sensor) and/or a second sensor module (not shown) (e.g., a fingerprint sensor) disposed on the first surface 210a of the housing 210, and/or a third sensor module 219 (e.g., an HRM sensor) disposed on the second surface 210b of the housing 210. The fingerprint sensor may be disposed on the first surface 210a of the housing 210. The fingerprint sensor (e.g., an ultrasonic or optical fingerprint sensor) may be disposed under the display 201 of the first surface 210a. The electronic device 200 may further include a sensor module not shown, such as at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor 204. According to an embodiment of the disclosure, the first sensor module 204 may be disposed under the display 201 and be constituted of a light-emitting module for emitting light and a light-receiving module for receiving light. For example, the first sensor module 204 may include an IR sensor.

The camera module 205, 212, and 213 may include a first camera device 205 disposed on the first surface 210a of the electronic device 200, a second camera device 212 disposed on the second surface 210b, and/or a flash 213. The camera module 205 and 212 may include one or a plurality of lenses, an image sensor, and/or an image signal processor. The flash 213 may include, for example, a light-emitting diode or a xenon lamp. In some embodiments of the disclosure, two or more lenses (e.g., wide-angle and telephoto lenses) and image sensors may be disposed on one side of the electronic device 200.

According to an embodiment of the disclosure, the second camera device 212 may include focal length fixed cameras 212-1 and 212-2 that perform a zoom function (e.g., a digital zoom function) based on a single vision lens with a fixed focal length. For example, the focal length fixed cameras 212-1 and 212-2 may have a lens fixed at a position corresponding to about 1× magnification, and it may take a first image corresponding to about 1× magnification. According to an embodiment of the disclosure, the electronic device 200 may perform a digital zoon function that at least partially crops the first image and enlarges the cropped image, when performing a zoom function exceeding about one magnification, using focal length fixed cameras 212-1, 212-2 (e.g., a second camera device 212).

According to an embodiment of the disclosure, the second camera device 212 may include a continuous optical zoom camera 212-3 capable of adjusting the focal length while the lens is physically moved and performing a zoom function according to a predetermined magnification range. For example, the continuous optical zoom camera 212-3 may support a certain magnification range (e.g., from about 3× magnification to about 5× magnification) by physically moving the lens. According to an embodiment of the disclosure, the electronic device 200 may adjust the focal length by physically moving the lens to a position corresponding to a specific magnification and may acquire a high-definition (e.g., high-quality) image through the continuous optical zoom camera 212-3.

The key input device 217 may be disposed on the side surface 210c of the housing 210. In another embodiment of the disclosure, the electronic device 200 may not include some or all of the above-mentioned key input devices 217, and the unincluded key input device 217 may be implemented in another form, such as a soft key, on the display 201. In another embodiment of the disclosure, the key input device 217 may be implemented using a pressure sensor included in the display 201.

The indicator (not shown) may be disposed, for example, on the first surface 210a of housing 210. The indicator may provide state information of the electronic device 200, for example, in optical form. In another embodiment of the disclosure, the light-emitting element may provide a light source that is interworked, for example, with the operation of the camera module 205. The indicator may include, for example, a light-emitting diode (LED), an IR LED, and a xenon lamp.

The connector hole 208 may include a connector hole accommodating a connector (e.g., a USB connector or IF module (interface connector port module)) for transmitting and receiving power and/or data to/from an external electronic device and/or a connector hole (or earphone jack) accommodating a connector transmitting and receiving an audio signal to/from the external electronic device.

Some camera modules 205 of the camera modules 205 and 212, some sensor modules 204 of the sensor modules 204 and 219, or indicator may be disposed to be exposed through the display 201. For example, the camera module 205, the sensor module 204, or the indicator may be disposed so that it can be in contact with the external environment through an opening perforated to the front plate 202 or the transmission area of the display in the internal space of the electronic device 200. According to an embodiment of the disclosure, the area facing the display 201 and the camera module 205 may be formed as a transmission area having a certain transmittance as part of the area displaying content. According to an embodiment of the disclosure, the transmission area may be formed to have a transmittance in the range of about 5%~20%. This transmission area may include an area that overlaps with an effective area (e.g., field of view area) of the camera module 205 through which light passes for generating an image using an image sensor. For example, the transmission area of the display 201 may include an area with a lower pixel density than the surrounding area. For example, the transmission area may replace the opening. For example, the camera module 205 may include an under display camera (UDC). In another embodiment of the disclosure, some sensor module 204 may be disposed to perform its function in the internal space of the electronic device 200 without being visually exposed through the front plate 202. For example, in this case, the area facing the sensor module 204 of the display 201 may not require a perforated opening.

Figure 3:
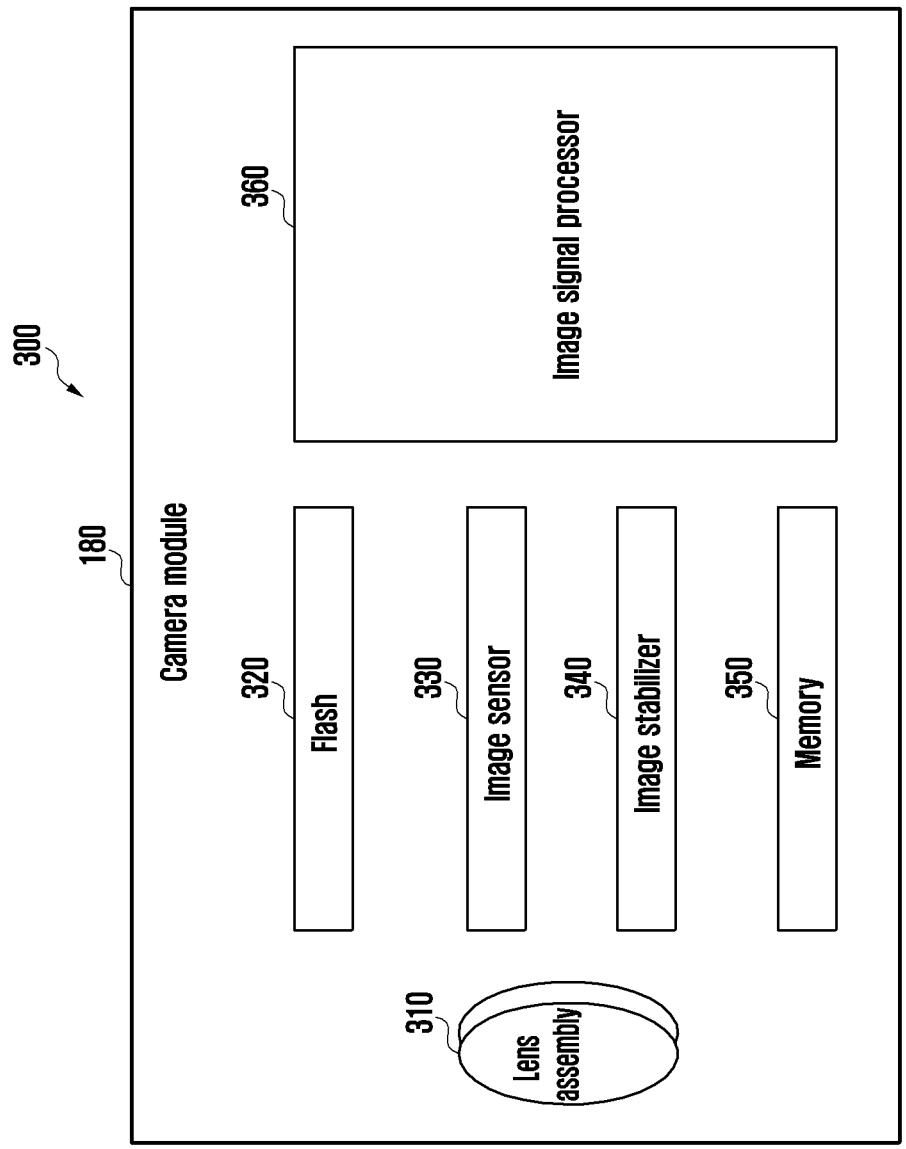
FIG. 3 is a block diagram of a camera module according to an embodiment of the disclosure.

FIG. 3 is a block diagram of a camera module according to an embodiment of the disclosure.

Referring to FIG. 3, a block diagram 300 illustrates the camera module 180 according to various embodiments. The camera module 180 may include a lens assembly 310, a flash 320, an image sensor 330, an image stabilizer 340, a memory 350 (e.g., a buffer memory), or an image signal processor 360.

According to an embodiment of the disclosure, the lens assembly 310 may collect light emitted from a subject that is the object of image taking. The lens assembly 310 may include one or more lenses. According to an embodiment of the disclosure, the camera module 180 may include a plurality of lens assemblies 310. In this case, the camera module 180, for example, may form a dual camera, a 360-degree camera, or a spherical camera. Some of the plurality of lens assemblies 310 may have the same lens properties (e.g., an angle of view, a focal length, an autofocus, a f number, or an optical zoom), or at least one lens assembly may have one or more lens properties that are different from the lens properties of other lens assemblies. The lens assembly 310 may include, for example, a wide-angle lens or a telephoto lens.

According to an embodiment of the disclosure, the flash 320 may emit light used to enhance light emitted or reflected from the subject. According to an embodiment of the disclosure, the flash 320 may include one or more light-emitting diodes (e.g., a red-green-blue (RGB) LED, a white LED, an infrared LED, or an ultraviolet (UV) LED), or a xenon lamp.

According to an embodiment of the disclosure, the image sensor 330 may acquire an image corresponding to the subject by converting the light emitted or reflected from the subject and transmitted through the lens assembly 310 into an electrical signal. According to an embodiment of the disclosure, the image sensor 330 may include, for example, one image sensor selected among image sensors with different attributes, such as an RGB sensor, a black and white (BW) sensor, an IR sensor, or a UV sensor, a plurality of image sensors having the same properties, or a plurality of image sensors having other attributes. Each image sensor included in the image sensor 330 may be implemented, for example, using a charged coupled device (CCD) sensor or a complementary metal oxide semiconductor (CMOS) sensor.

According to an embodiment of the disclosure, the image stabilizer 340 may move at least one lens or image sensor 330 included in the lens assembly 310 in a specific direction in response to the movement of the camera module 180 or the electronic device 101 including the same, or it may control the operating feature (e.g., the read-out timing adjustment, or the like) of the image sensor 330. This compensates for at least some of the negative effects of the movement on the image being taken. According to an embodiment of the disclosure, the image stabilizer 340 may detect such movement of the camera module 180 or the electronic device 101 using a gyro sensor (not shown) or an acceleration sensor (not shown) disposed inside or outside the camera module 180. According to an embodiment of the disclosure, the image stabilizer 340 may be implemented, for example, as an optical image stabilizer. The memory 350 may temporarily store at least a portion of the image acquired through the image sensor 330 for the next image processing operation. For example, when the acquisition of an image according to the shutter is delayed, or when a plurality of images are acquired at high speed, the acquired original image (e.g., Bayer-patterned image or high resolution image) is stored in the memory 350, and the corresponding copy image (e.g., low resolution image) may be previewed through the display module 160. Then, when the specified conditions are satisfied (e.g., a user input or a system command), at least a portion of the original image stored in the memory 350 may be acquired and processed, for example, by the image signal processor 360. According to an embodiment of the disclosure, the memory 350 may be consisted of at least a portion of the memory 130 or a separate memory operating independently.

According to an embodiment of the disclosure, the image signal processor 360 may perform one or more image processing on an image acquired through the image sensor 330 or an image stored in the memory 350. The one or more image processes may include, for example, a depth map generation, a three-dimensional modeling, a panorama generation, a feature point extraction, an image compositing, or an image compensation (e.g., a noise reduction, a resolution adjustment, a brightness adjustment, a blurring, a sharpening, or a softening). Additionally, or in general, the image signal processor 360 may perform a control (e.g., an exposure time control, or readout timing control, or the like) on at least one of the components included in the camera module 180 (e.g., an image sensor 330). The image processed by the image signal processor 360 may be re-stored in the memory 350 for further processing or may be provided as an external component (e.g., a memory 130, a display module 160, the external electronic device 102, the external electronic device 104, or a server 108) of the camera module 180. According to an embodiment of the disclosure, the image signal processor 360 may be configured with at least a portion of the processor 120 or may be configured with a separate processor operating independently of the processor 120. When the image signal processor 360 is configured as a separate processor from the processor 120, at least one image processed by the image signal processor 360 may be displayed through the display module 160 after undergoing image processing by the processor 120 or additional image processing.

According to an embodiment of the disclosure, the electronic device 101 may include a plurality of camera modules 180, each of which has different attributes or functions. In this case, for example, at least one of the plurality of camera modules 180 may be a wide-angle camera and at least another may be a telephoto camera. Similarly, at least one of the plurality of camera modules 180 may be a front camera, and at least another may be a rear surface camera.

According to an embodiment of the disclosure, the electronic device 101 may include a plurality of cameras supporting different magnifications. For example, at least one of the plurality of cameras may include a wide camera (e.g., a first camera, a tele camera, a focal length fixed camera 212-1, 212-2) supporting a digital zoom function while the focal length is fixed (e.g., the zoom function is fixed at a specific magnification). For example, at least another of the plurality of cameras may adjust the focal length by physically moving the lens, and a continuous optical zoom camera (e.g., a second camera, a continuous optical zoom camera 212-3 of FIG. 2B) supporting a range of magnifications (e.g., a range of about 3× magnification to about 5× magnification).

Figure 4:
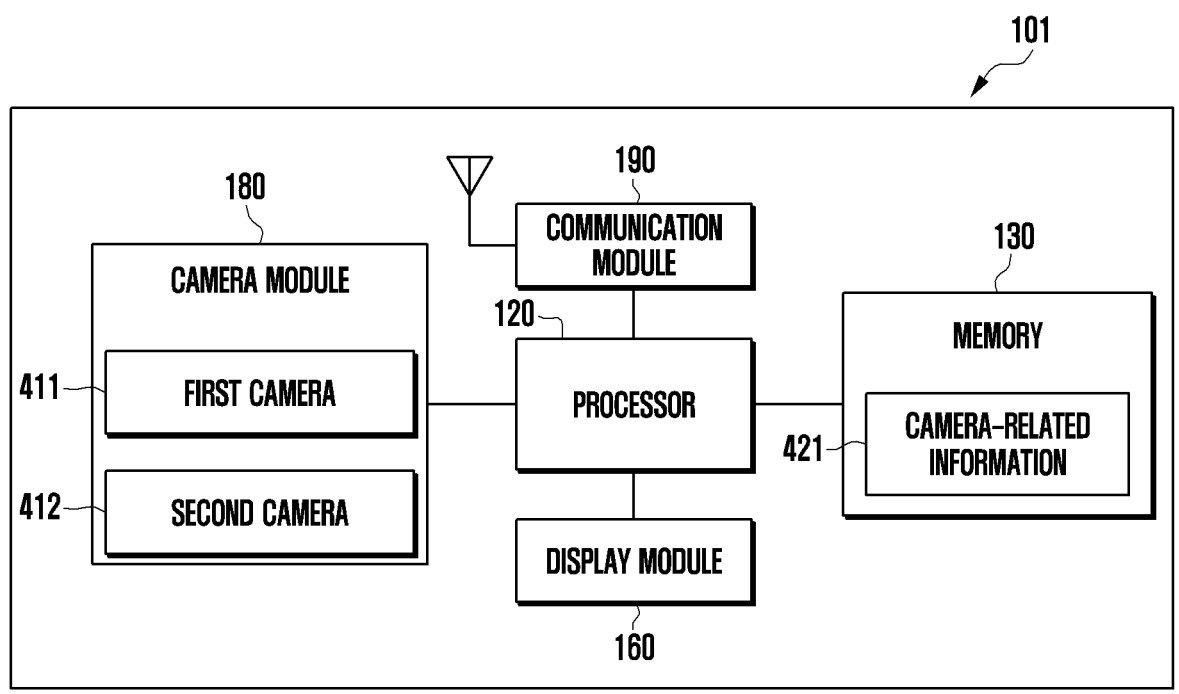
FIG. 4 is a block diagram of an electronic device according to an embodiment of the disclosure.

FIG. 4 is a block diagram of an electronic device according to an embodiment of the disclosure.

The electronic device 101 of FIG. 4 may be at least partially similar to the electronic device 101 of FIG. 1 and the electronic device 200 of FIGS. 2A and 2B or may further include other embodiments of the electronic device 101. The camera module 180 of FIG. 4 may be at least partially similar to the camera module 180 of FIG. 3 or may further include other embodiments of the camera module 180.

Referring to FIG. 4, the electronic device (e.g., the electronic device 101 of FIG. 1) may include a processor (e.g., the processor 120 of FIG. 1), a memory (e.g., the memory 130 of FIG. 1), a display module (e.g., the display module 160 of FIG. 1), a camera module (e.g., the camera module 180 of FIG. 1) and/or a communication module (e.g., the communication module 190 of FIG. 1). The memory 130 may store information 421 related to the lens of the camera. The camera module 180 may include different types of cameras (e.g., a first camera 411 and a second camera 412). For example, the first camera 411 may include a camera having a single vision lens with a fixed focal length. The first camera 411 may maintain a fixed focal length (e.g., a fixed position of the lens). For example, the second camera 412 may include a continuous optical zoom camera capable of adjusting the focal length while the lens is physically moved. For example, the second camera 412 may include a continuous optical zoom camera capable of adjusting the focal length while the lens is physically moved.

According to an embodiment of the disclosure, the processor 120 of the electronic device 101 may control the electronic device 101 and/or other components (e.g., the hardware and/or software components) of the external electronic device 201 and perform various data processing and/or calculation by executing a program (e.g., the program 140 of FIG. 1) stored in the memory 130. According to an embodiment of the disclosure, the processor 120 may be operatively, functionally and/or electrically connected to the memory 130, the display module 160, the camera module 180, and/or the communication module 190.

According to an embodiment of the disclosure, the memory 130 may store camera-related information 421. For example, the camera-related information 421 may include information related to the first camera 411 (e.g., a focal length fixed camera) and a second camera 412 (e.g., a continuous optical zoom camera). The camera-related information 421 may include at least one of the magnification information supported by the camera, the position of at least one lens included in the camera, the movable section of the lens, the movement area of the lens, the movement distance of the lens, the movement time of the lens, the movement speed of the lens, the movement timing of the lens, the movement direction of the lens, the exposure time information of the camera, the user history related to the performance of the zoom function, and/or the frames per second (FPS) information of the camera.

According to an embodiment of the disclosure, the processor 120 of the electronic device 101 may transmit a control signal (e.g., instructions) for at least partially moving the lens of the second camera 412 (e.g., a continuous optical zoom camera). In response to receiving the control signal, the second camera 412 may move the position of the lens (e.g., zoom lens) to a specific position.

According to an embodiment of the disclosure, the processor 120 of the electronic device 101 may display a first image (e.g., a first preview image) taken using the first camera 411 through the display module 160 in response to the performance of a function related to a camera. For example, the first camera 411 may take an image of the first magnification (e.g., about 1× magnification). The processor 120 of the electronic device 101 may physically move the lens of the second camera 412 to a specific position (e.g., a preset first position) in advance while the first image is displayed. For example, when the range of magnification supported by the second camera 412 is from about 3× magnification to about 5× magnification, the processor 120 may determine the movable section of the lens based on the range of magnification and may move the lens to a position corresponding to the magnification included in the range of magnification. For example, the first position corresponding to about 3× magnification may be the starting point (e.g., a starting position, initial position, default position) of the lens, and the second position corresponding to about 5× magnification may be the end point (e.g., a ending position) of the lens. The 1-1 position is the default position (e.g., a starting position) of the lens and may include the lens position in a situation where the lens is not driven. The 1-1 position may include a lens position corresponding to the minimum magnification within the movable section of the lens. The 1-2 position may include a lens position corresponding to the maximum magnification within the movable section of the lens. The processor 120 may move the lens to a position corresponding to a specific magnification while the lens has been moved in advance to an intermediate point (e.g., a preset first position) between the 1-1 position and the 1-2 position. For example, by placing the lens at the midpoint, the movement of the lens can be reduced. For example, the midpoint may be configured to a point corresponding to about 4× magnification within a range of magnifications (e.g., about 3× magnification to about 5× magnification). As the position of the lens of the second camera 412 is moved in advance to the midpoint of the movable section (e.g., a point corresponding to about 4× magnification), the lens may be moved relatively quickly when performing a zoom function based on the second camera 412. According to an embodiment of the disclosure, the electronic device 101 may quickly display an image according to the zoom function based on the magnification range supported by the first camera 411 and the second camera 412.

According to an embodiment of the disclosure, the display module 160 may include a display (e.g., a screen) of the electronic device 101 and display an image taken through the camera module 180. For example, the processor 120 may activate the camera module 180 in performing a function related to the camera module 180 and display an image taken using the camera module 180 through the display module 160. In response to the performance of the zoom function, the processor 120 may display at least a partially enlarged image based on a plurality of cameras (e.g., the first camera 411, the second camera 412) through the display module 160.

According to an embodiment of the disclosure, the camera module 180 may take an image using light, and may include one or more lenses (e.g., a zoom lens, an auto focus (AF) lens) (e.g., a lens assembly 310 of FIG. 3), an image sensor (e.g., an image sensor 330 of FIG. 3), an image signal processor (e.g., an image signal processor 360 of FIG. 3), and/or a flash (e.g., a flash 320 of FIG. 3). Referring to FIG. 4, the camera module 180 may include different types of cameras (e.g., a first camera 411, a second camera 412). For example, the first camera 411 may include a camera having a single vision lens with a fixed focal length. For example, the first camera 411 may not support optical zoom but may include a camera that supports a digital zoom. The second camera 412 may include a continuous optical zoom camera in which the focal length is adjusted as the lens is physically moved. For example, the second camera 412 may include a camera supporting an optical zoom and a digital zoom. For example, the first camera 411 may acquire a first image corresponding to about 1× magnification and may support a digital zoom function based on the acquired first image. For example, the second camera 412 may physically move at least one lens and may support an optical zoom function corresponding to the position of at least one lens based on a range (e.g., a range of supportable magnifications) from about 3× magnification to about 5× magnification.

According to an embodiment of the disclosure, in response to the execution of a function related to a camera, the processor 120 may acquire a first image (e.g., a first preview image) of the external environment using the first camera 411 (e.g., a camera supporting a zoom function of about 1× magnification) and display the first image through the display module 160. For example, the first image may include a preview image of about 1× magnification representing the appearance of the actual external environment. In a situation where the first image taken through the first camera 411 is displayed on the display module 160, the processor 120 may move at least one lens included in the second camera 412 to a configured position (e.g., a preset first position). For example, the processor 120 may move the at least one lens to an intermediate point (e.g., a position corresponding to the intermediate magnification) in a section where at least one lens can be moved. For example, the first time it takes for the lens to move from the starting position (e.g., the default position, the position corresponding to the minimum magnification) to the ending position (e.g., the position corresponding to the maximum magnification) may be longer than the second time it takes for the lens to move from the intermediate position (e.g., the position corresponding to the intermediate magnification) to the ending position. According to an embodiment of the disclosure, since the electronic device 101 takes much time in a situation where the lens is physically moved, at least one lens included in the second camera 412 may be moved to a configured position in advance in response to the execution of a function related to a camera.

According to an embodiment of the disclosure, the processor 120 may perform a digital zoom function when performing a zoom function based on the first camera 411. For example, the processor 120 may at least partially crop the first image with respect to the center point (e.g., the center point, the exact center point) of the cropped first image and may at least partially enlarge the first image. According to an embodiment of the disclosure, when the processor 120 performs a zoom function at the magnification (e.g., from about 3× magnification to about 5× magnification) supported by the second camera 412, the processor 120 may move the position of the at least one lens included in the second camera 412 while performing a digital zoom function based on the first camera 411. For example, in response to a request for a zoom function to about 4× magnification, the processor 120 may display an image where the first image is progressively enlarging by applying a digital zoom function to a first image (e.g., a preview image taken based on about 1× magnification) taken using the first camera 411. For example, the processor 120 may display a corresponding magnification (e.g., a value from about 1× magnification to about 4× magnification) to the enlarged image as the first image is progressively enlarged. The processor 120 may enlarge at least a portion of the first image at about 4× magnification and may display a portion of the first image enlarged at about 4× magnification through the display module 160. The processor 120 may move at least one lens (e.g., a zoom lens, an AF lens) included in the second camera 412 to a position (e.g., a preset first position) corresponding to about 4× magnification during the time of applying the digital zoom function. The processor 120 may acquire a second image using at least one lens moved to a position corresponding to about 4× magnification. For example, the second image may be substantially the same as the first image enlarged at about 4× magnification. The processor 120 may physically move at least one lens and acquire a second image (e.g., a second preview image) using a lens disposed at a position corresponding to about 4× magnification. For example, the second image may include an image of a higher definition (e.g., a higher quality) than the first image. The processor 120 may change the first image, enlarged to about 4× magnification and displayed through the display module 160, to the second image. According to an embodiment of the disclosure, the second camera 412 may acquire a relatively higher definition and quality image than the first image as at least one lens physically moves and an image corresponding to the zoom function of a specific magnification is taken. For example, the second image may include a relatively clearer and higher definition image than the first image.

According to an embodiment of the disclosure, the processor 120 of the electronic device 101 may perform a digital zoom function at a specific magnification based on the first image taken through the first camera 411. The processor 120 may enlarge at least a portion of the first image based on the specific magnification and display it through the display module 160. The processor 120 may move at least one lens included in the second camera 412 to a position corresponding to the specific magnification while performing a digital zoom function at a specific magnification in connection with the first image. The processor 120 may use the second camera 412 to acquire a second image taken based on a particular magnification. For example, the first image, for which the digital zoom function is performed, and the second image may be displayed as if they are substantially the same image. According to an embodiment of the disclosure, when at least one lens included in the second camera 412 completes moving to a position corresponding to a specific magnification, the processor 120 may change the enlarged first image displayed through the display module 160 to the second image.

According to an embodiment of the disclosure, the electronic device 101 may physically move at least one lens included in the second camera 412 and use the at least one lens to acquire a second image of relatively high definition (e.g., a high quality) than the enlarged first image. For example, the enlarged first image and the second image may appear as images taken based on substantially the same angle of view. After the lens movement of the second camera 412 is completed, the electronic device 101 may change the first image to the second image, thereby reducing the distortion of the image and the color difference between the cameras. According to an embodiment of the disclosure, the electronic device 101 may continuously and smoothly change from a first image taken through the first camera 411 to a second image taken through the second camera 412.

According to an embodiment of the disclosure, the electronic device 101 may not display the image substantially at the same time while taking an image in the process of moving the lens included in the second camera 412, but instead it may physically move the lens included in the second camera 412 while the situation (e.g., the situation in which a portion of the first image is progressively enlarged) in which the first image is enlarged is displayed through the display module 160. After the movement of the lens is completed, the electronic device 101 may acquire a second image using the second camera 412 and store the acquired second image in the memory 130. According to an embodiment of the disclosure, after the movement of the lens is completed, the electronic device 101 may change the first image displayed through the display module 160 to a second image taken using the lens of which the movement is completed. Since the electronic device 101 acquires a second image using the second camera 412 in which the lens has been moved, visual discomfort because of the change from the first image to the second image can be reduced. In performing the zoom function, the electronic device 101 may display a second image corresponding to an image of relatively higher definition image than the first image.

According to an embodiment of the disclosure, the electronic device 101 may perform a digital zoom function on the first image taken through the first camera 411 in response to a signal requesting a zoom function to a specific magnification. The electronic device 101 may display a situation in which a portion of the first image is enlarged through the display module 160 during the time required for the lens of the second camera 412 to move to a position corresponding to a specific magnification. According to an embodiment of the disclosure, the electronic device 101 may capture a portion of the at least partially enlarged first image in the case that a photographing signal (e.g., an image capture signal) is received before the required time has elapsed (e.g., before the movement of the lens of the second camera 412 is completed). The electronic device 101 may capture an image in which a portion of the first image is enlarged based on the first image in which a digital zoom function is performed. The electronic device 101 may display the captured image (e.g., a portion of the enlarged first image) through the display module 160. In this case, the electronic device 101 may stop moving the lens of the second camera 412 or restore the lens of the second camera 412 to a configured position (e.g., the first position). According to another embodiment of the disclosure, the electronic device 101 may move the lens of the second camera 412 to a position corresponding to the specific magnification even in a situation where the captured image is displayed through the display module 160. For example, in response to a situation of displaying a preview image, the electronic device 101 may display a second image taken using the second camera 412 as the preview image.

According to an embodiment of the disclosure, the electronic device (e.g., the electronic device 101 of FIGS. 1 and/or 4) may include a first camera (e.g., the first camera 411 of FIG. 4), a second camera (e.g., the second camera 412 of FIG. 4) including a lens moving within a movable range, a display (e.g., the display module 160 of FIGS. 1 and/or 4), a processor (e.g., the processor 120 of FIGS. 1 and/or 4) and a memory (e.g., the memory 130 of FIGS. 1 and/or 4) operatively connected to the processor 120 and configured to store instructions. In response to the execution of a function related to the first camera 411, the electronic device 101 may display a first preview image of a first magnification acquired through the first camera 411 through the display 160. The electronic device 101 may move the lens included in the second camera 412 from a starting position to a preset first position configured based on the movable range of the lens while the first preview image of the first magnification is displayed. In response to an input requesting a zoom function to a second magnification, the electronic device 101 may move the lens of the preset first position to a second position corresponding to the second magnification. The electronic device 101 may acquire a second preview image corresponding to the second magnification through the second camera 412 based on the lens moved to the second position.

According to an embodiment of the disclosure, a first time it takes for the lens to move from the preset first position to the second position is shorter than a second time it takes for the lens to move from the starting position to the second position.

According to an embodiment of the disclosure, the electronic device 101 may identify whether the second magnification is included in a range of magnifications supported by the second camera 412 in response to an input requesting a zoom function to the second magnification. When the second magnification is included in a range of magnification, the electronic device 101 may move the lens included in the second camera 412 to a second position corresponding to the second magnification.

According to an embodiment of the disclosure, the electronic device 101 may maintain the lens included in the second camera 412 in the configured first position in case that the second magnification is not included in the specified range of magnification.

According to an embodiment of the disclosure, the electronic device 101 may enlarge at least a portion of the first preview image by the second magnification and display the first preview image in response to the input requesting the zoom function to the second magnification, and move the lens included in the second camera to the second position corresponding to the second magnification when a predetermined time is exceeded from a time of displaying the first preview image enlarged to the second magnification.

According to an embodiment of the disclosure, the electronic device 101 may change the first preview image enlarged by the second magnification to a second preview image corresponding to the second magnification, display the second preview image through the display 160, and display after changing the second preview image to the first preview image enlarged by the second magnification in response to the input requesting a zoom function to the first magnification while the second preview image corresponding to the second magnification is displayed. The electronic device 101 may display the first preview image enlarged by the second magnification by reducing it by the first magnification.

According to an embodiment of the disclosure, the electronic device 101 may move the lens disposed in the second position and included in the second camera 412 to the configured first position in response to an input requesting a zoom function to the first magnification while the second preview image corresponding to the second magnification is displayed.

According to an embodiment of the disclosure, the electronic device 101 may further include a third camera 910 for acquiring a third preview image corresponding to the third magnification. The electronic device 101 may enlarge the second preview image by the third magnification and display the second preview image in response to an input requesting a zoom function to the third magnification while the second preview image corresponding to the second magnification acquired through the second camera 412 is displayed. The electronic device 101 may acquire a third preview image corresponding to the third magnification using the third camera 910. The electronic device 101 may change the second preview image enlarged by the third magnification to the third preview image and display the second preview image.

According to an embodiment of the disclosure, the configured first position may be configured based on at least one of a movable section of the lens included in the second camera 412, a movement distance of the lens, a movement time of the lens, a movement speed of the lens, a movement timing of the lens, a distance to an object included in the first preview image, or the user history related to the performance of the zoom function.

According to an embodiment of the disclosure, the first camera may include a focal length fixed camera in which the focal length is fixed, and which acquires an image corresponding to the first magnification, and the second camera 412 may include a continuous optical zoom camera in which at least one lens physically is moved, and which acquires an image corresponding to the specified range of magnification.

According to an embodiment of the disclosure, the at least one lens comprises at least one of a zoom lens performing a zoom function corresponding to a specific magnification or an auto focus (AF) lens corresponding to a specific magnification based on a disposition position of the zoom lens.

According to an embodiment of the disclosure, the electronic device 101 may perform a digital zoom function based on the first preview image acquired using the first camera 411 in response to an input requesting a zoom function to a second magnification. The electronic device 101 may display a first preview image in which at least a portion of the first preview image is enlarged by a second magnification.

According to an embodiment of the disclosure, the electronic device 101 may identify a situation where an input requesting a zoom change occurs continuously. The electronic device 101 may move, when the requested time for the zoom change exceeded a preset threshold, the lens included in the second camera to the starting position.

FIG. 5 is a flowchart illustrating a method of performing a zoom function using different types of cameras according to an embodiment of the disclosure.

In the following embodiments of the disclosure, each operation may be performed sequentially, but not necessarily sequentially. For example, the order of each operation may be changed, and at least two operations may be performed in parallel.

Referring to FIG. 5, it may be at least partially similar to the electronic device 101 of FIG. 1, the electronic device 200 of FIGS. 2A and 2B, and the electronic device 101 of FIG. 4 or may further include other embodiments of the electronic device 101. The first and second cameras described in FIG. 5 may be at least partially similar to the first camera 411 and the second camera 412 included in the camera module 180 of FIG. 4 or may further include other embodiments.

Referring to FIG. 5, in operation 501, the processor of the electronic device 101 (e.g., the processor 120 of FIG. 4) may perform a function related to the first camera 411 (e.g., the first camera 411 included in the camera module 180 of FIG. 4). For example, the first camera 411 may include a focal length fixed camera (e.g., the focal length fixed camera 212-1 and 212-2 of FIGS. 2A and 2B) performing a zoom function (e.g., a digital zoom function) in a state (e.g., may support a zoom function (e.g., a digital zoom function) of the acquired image based on a fixed magnification (e.g., about 1× magnification)) in which the focal length is fixed. For example, a function related to a camera may include a photographic function for acquiring at least one image using a camera, and an external environment photographing function for providing an augmented reality service using a camera.

In operation 503, the processor 120 may display a first image (e.g., a first preview image) of the first magnification (e.g., about 1× magnification) acquired using the first camera 411 on a display (e.g., the display module 160 of FIG. 4). For example, the processor 120 may acquire a first image (e.g., a preview image representing the actual external environment) of the first magnification through the first camera 411, and it may display the acquired first image through the display 160. For example, the first image may include a preview image.

In operation 505, the processor 120 may move the lens (e.g., a zoom lens, an AF lens) included in the second camera 412 to the first position (e.g., a preset first position) in response to the execution of a function related to the first camera 411. For example, the second camera 412 may include a continuous optical zoom camera (e.g., the continuous optical zoom camera 212-3 of FIGS. 2A and 2B) in which the lens is physically moved to perform a zoom function according to a range of magnifications. For example, the second camera 412 may support a zoom function from about 3× magnification to about 5× magnification by physically moving at least one lens. At least one lens may be moved based on a range of magnifications (e.g., from about 3× magnification to about 5× magnification). To reduce the time required for the movement of the lens, the processor 120 may move the lens of the second camera 412 from a starting position (e.g., an initial position, default position) to a configured position (e.g., a preset first position) based on a range of magnifications in response to the execution of a function related to the first camera 411. For example, the processor 120 may move the lens of the second camera 412 from the starting position to a position (e.g., the preset first position) corresponding to about 4× magnification which corresponds to the midpoint of about 3× magnification and about 5× magnification. For example, since the lens is located at the midpoint of the movable section, when the lens moves to a position corresponding to about 3× magnification and about 5× magnification, the lens may move relatively quickly.

In operation 507, the processor 120 may identify a signal requesting a zoom function at the second magnification. For example, the second magnification may include a specific magnification value between about 3× magnification to about 5× magnification supported by the second camera 412. According to an embodiment of the disclosure, the second camera 412 may include a continuous optical zoom camera that performs a zoom function of a specific magnification by physically moving at least one lens (e.g., a zoom lens, an AF lens). For example, the second magnification may include a magnification that can be supported by physically moving at least one lens in the second camera 412.

In operation 509, the processor 120 may display the first image enlarged by the second magnification (e.g., a specific magnification among about 3× magnification to about 5× magnification). For example, the processor 120 may use a digital zoom function to enlarge at least a portion of the first image by a second magnification. For example, the processor 120 may crop at least a portion of the first image of the first magnification and may enlarge the cropped image based on the second magnification. For another example, the processor 120 may enlarge a portion of the first image of the first magnification to the center point and then crop the first image at least partially. The processor 120 may display a first image enlarged by the second magnification through the display 160.

In operation 511, the processor 120 may move the lens of the second camera 412 moved to the first position in operation 505 to a second position corresponding to the second magnification while displaying the first image in enlargement. For example, when the lens of the second camera 412 is moved to a position corresponding to about 4× magnification (e.g., the preset first position), the processor 120 may move the lens to a second position corresponding to the second magnification (e.g., a position corresponding to a specific magnification among about 3× magnification to about 5× magnification). For example, when the second magnification is about 3× magnification, the processor 120 may move a lens located at about 4× magnification (e.g., the preset first position) to a position corresponding to about 3× magnification (e.g., the 1-1 position, starting position of the lens). For another example, when the second magnification is about 5× magnification, the processor 120 may move the lens located at about 4× magnification (e.g., the preset first position) to a position corresponding to about 5× magnification (e.g., the 1-2 position, ending position of the lens).

In operation 513, the processor 120 may acquire a second image (e.g., a second preview image) using the second camera 412 in which the lens has been moved to the second position. For example, the second image may be taken using a second camera 412, which is a continuous optical zoom camera, and may include an image to which a zoom function (e.g., an optical zoom function) of the second magnification is applied. According to an embodiment of the disclosure, the second image may include a relatively higher definition and higher quality image than the first image enlarged by the second magnification.

In operation 515, the processor 120 may change the first image (e.g., a first preview image) enlarged by the second magnification displayed on the display 160 to the second image (e.g., a second preview image). For example, the processor 120 may change the first image enlarged by the second magnification, which is in a relatively low definition, to a second image of relatively high definition, and display the second image through the display 160. According to an embodiment of the disclosure, the electronic device 101 may display a relatively high definition image without visual discomfort because of the performance of the zoom function when performing the zoom function.

According to an embodiment of the disclosure, the processor 120 of the electronic device 101 may display a first image (e.g., a first preview image taken at the first magnification) taken through the first camera 411 in response to the execution of a function related to a camera, while substantially simultaneously moving at least one lens (e.g., a zoom lens, an AF lens) included in the second camera 412 to the configured first position. In response to a signal requesting a zoom function to a second magnification for the first image, the processor 120 may enlarge the first image to the second magnification based on the digital zoom function, and substantially simultaneously move at least one lens included in the second camera 412 from the first position to the second position. For example, the second position may be the position of the lens for acquiring a second image corresponding to the second magnification. The processor 120 may acquire a second image (e.g., a second preview image taken at the second magnification) taken through the second camera 412 based on the lens moved to the second position. The processor 120 may change the first image enlarged by the second magnification to the acquired second image. According to an embodiment of the disclosure, the second image may include an image acquired based on the at least one lens after the at least one lens included in the second camera 412 is physically moved. The second image may include a relatively higher definition or higher quality image than the first image.

According to an embodiment of the disclosure, in the operation of moving at least one lens from the first position to the second position, if the first and second positions are the same, operation 509 and operation 511 of FIG. 5 may be omitted. For example, in operation 507, the processor 120 may identify the occurrence of a signal requesting a zoom function to the second magnification. The processor 120 may identify a second position corresponding to the second magnification, and when the identified second position matches the position of the current lens (e.g., the first position), the processor 120 may acquire a second image using the second camera 412 in operation 513. According to an embodiment of the disclosure, when the first position and the second position are the same, the processor 120 may perform an operation of acquiring a second image using the second camera 412 in operation 513 without performing an operation of enlarging the first image by a second magnification (e.g., operation 509) and moving the lens to a second position corresponding to the second magnification (e.g., operation 511).

Figure 6A:
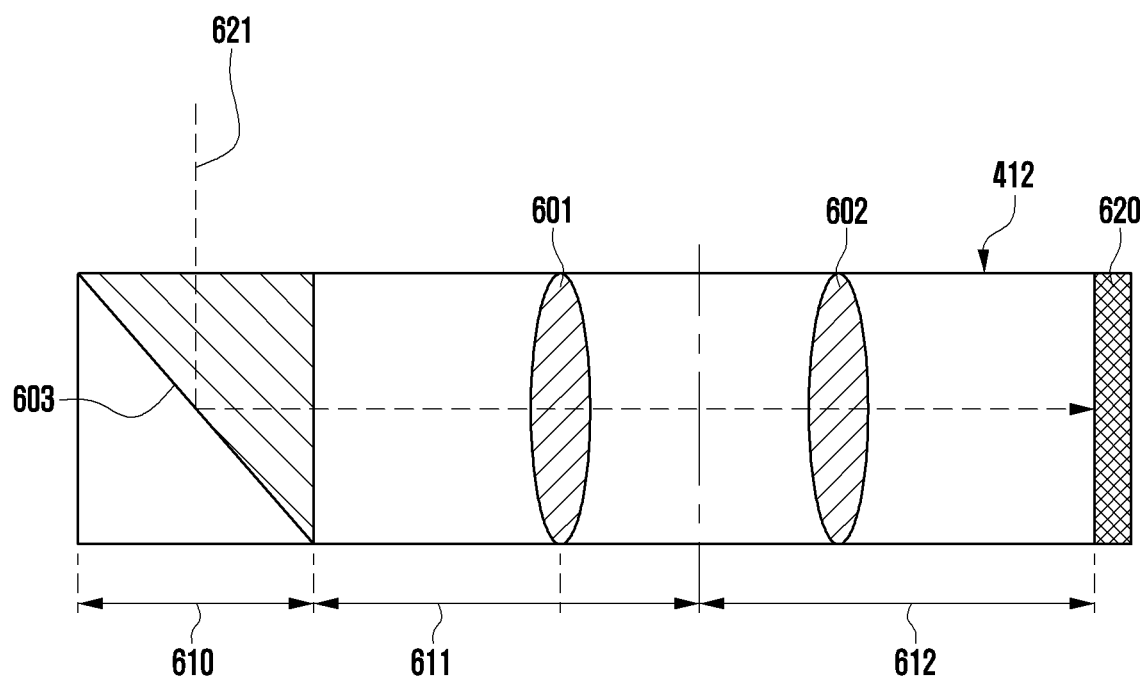
FIG. 6A is a diagram illustrating a structure of a continuous optical zoom camera according to an embodiment of the disclosure.
Figure 6B:
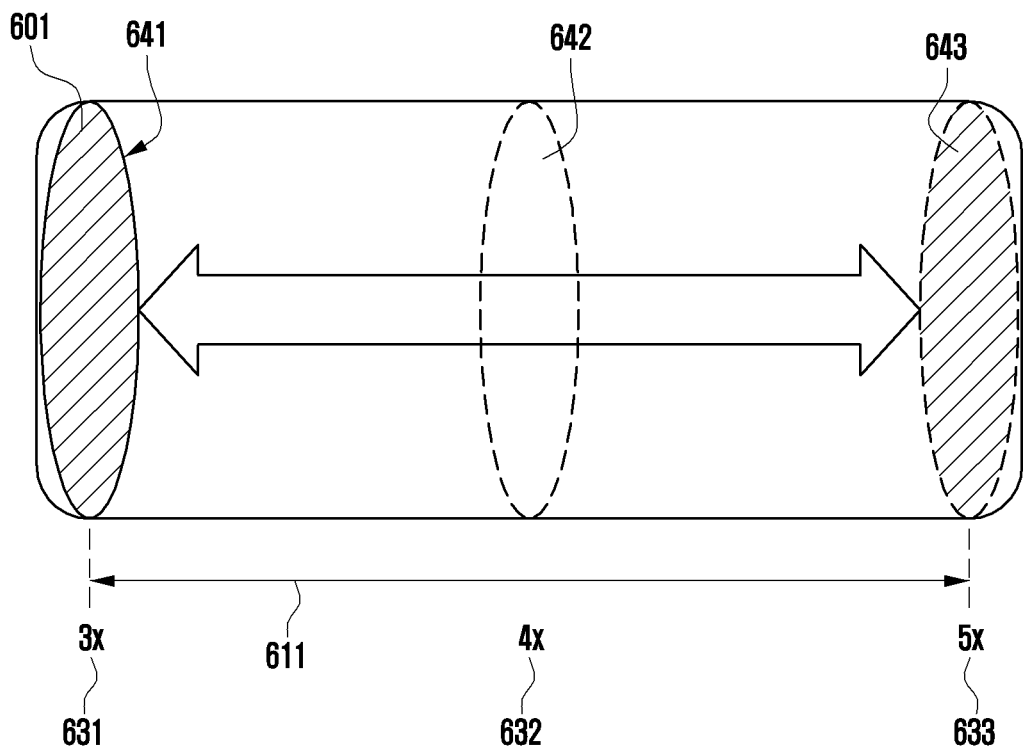
FIG. 6B is a diagram illustrating a position and movable section of a lens of a continuous optical zoom camera according to an embodiment of the disclosure.
Figure 6C:
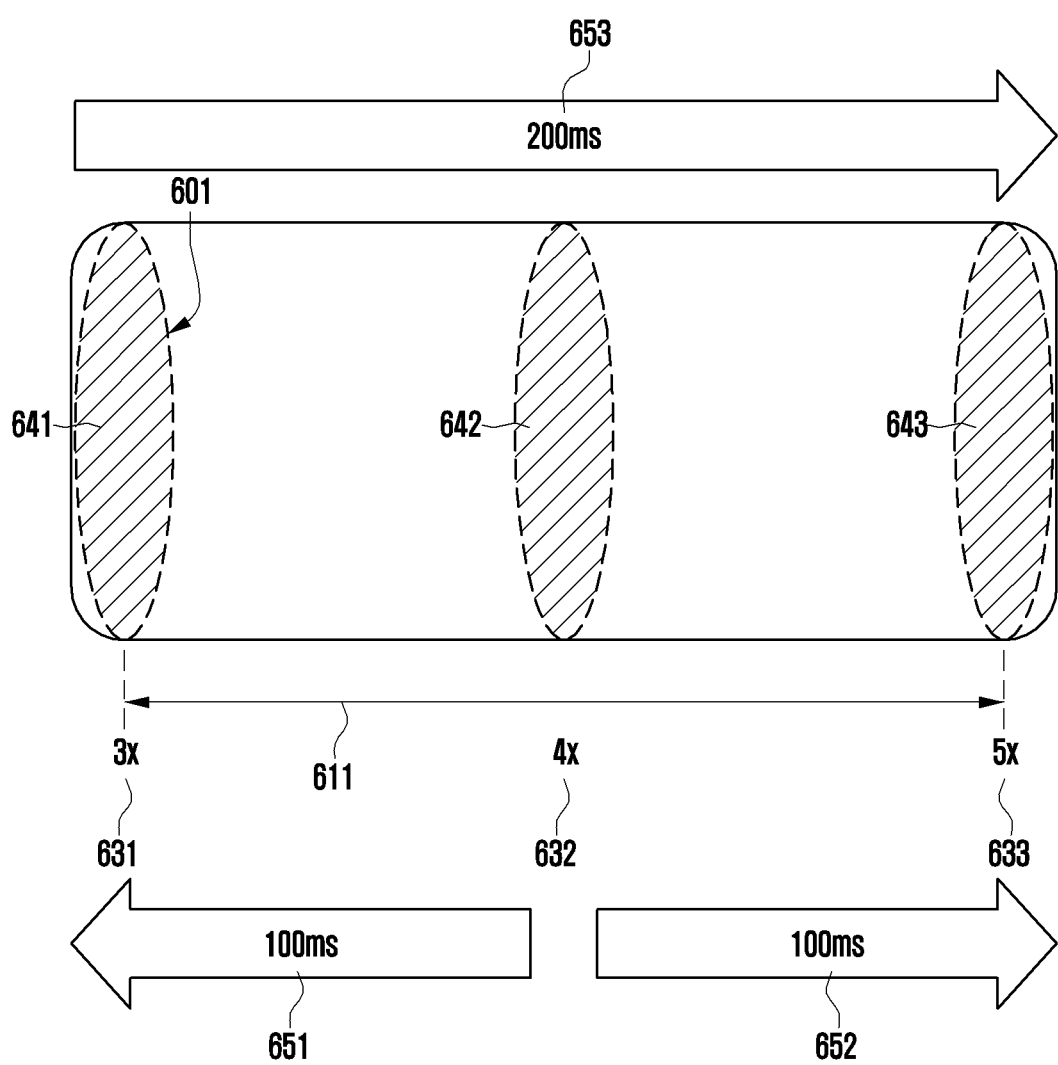
FIG. 6C is a diagram illustrating a time required for lens movement of a continuous optical zoom camera according to an embodiment of the disclosure.

FIG. 6A is a diagram illustrating a structure of a continuous optical zoom camera according to an embodiment of the disclosure. FIG. 6B is a diagram illustrating a position and movable section of a lens of a continuous optical zoom camera according to an embodiment of the disclosure. FIG. 6C is a diagram illustrating a time required for lens movement of a continuous optical zoom camera according to an embodiment of the disclosure.

Referring to FIGS. 6A, 6B, and 6C, the electronic devices 101 is at least partially similar to the electronic device 101 of FIG. 1, the electronic device 200 of FIGS. 2A and 2B, and the electronic device 101 of FIG. 4. The continuous optical zoom camera described in FIGS. 6A, 6B, and 6C may be at least partially similar to the second camera 412 included in the camera module 180 of FIG. 4 or may further include other embodiments.

Referring to FIG. 6A, it illustrates the structure of a continuous optical zoom camera (e.g., the second camera 412 of FIG. 4) of a camera module (e.g., the camera module 180 of FIG. 4) included in the electronic device 101. For example, the continuous optical zoom camera may include a prism member 603, a zoom lens 601, an auto focus (AF) lens 602, and an image sensor 620. For example, the prism member 603 may change the path of light 621 so that light received through the continuous optical zoom camera is directed toward the image sensor 620 and may be disposed in the prism area 610. The zoom lens 601 may be physically moved within the zoom lens movement area 611 when performing a zoom function at a specific magnification. The zoom lens 601 may be moved to a position corresponding to a specific magnification. The AF lens 602 may be physically moved within the AF lens movement area 612 when performing a zoom function at a specific magnification. The AF lens 602 may focus the light being received. The image sensor 620 may generate an image based on the light being received.

According to an embodiment of the disclosure, the zoom lens 601 may be positioned based on a specific magnification, and the AF lens 602 may be positioned based on the distance from the object (e.g., the subject) to focus and the position (e.g., focal length) of the zoom lens 601 according to a specific magnification. According to an embodiment of the disclosure, the electronic device 101 may move at least one lens (e.g., a zoom lens 601, an AF lens 602) to a first position corresponding to the first magnification in response to the performance of the zoom function at the first magnification. Hereinafter, at least one lens (e.g., a zoom lens 601) is disclosed to be moving, but is not limited to a particular lens.

Referring to FIG. 6B, it illustrates the position of the zoom lens 601 according to the zoom function to a specific magnification (e.g., about 3× magnification to about 5× magnification) when the zoom lens 601 moves within the zoom lens movement area 611. For example, the zoom lens 601 may support a zoom function from about 3× magnification 631 to about 5× magnification 633. The zoom lens 601 may be physically moved within the zoom lens movement area 611 and may support a zoom function based on a magnification of about 3× 631 when it is located in the first position 641 (e.g., a starting position of the lens), a zoom function based on a magnification of about 4× 632 in case that it is located in the second position 642, and a zoom function based on a magnification of about 5× 633 in case that it is located in the third position 643 (e.g., a ending position of the lens).

Referring to FIG. 6C, it illustrates the movement time according to the movement distance when the zoom lens 601 moves within the zoom lens movement area 611 (e.g., a movable range of the lens). For example, when the zoom lens 601 moves from the first position 641 to the third position 643 through the second position 642, it may take about 200 ms 653 of movement time. For example, when the zoom lens 601 disposed at the second position 642 moves to the first position 641, it takes about 100 ms 651 of movement time, and when it moves to the third position 643, it may take about 100 ms 652 of movement time.

According to an embodiment of the disclosure, the processor (e.g., the processor 120 of FIG. 4) of the electronic device 101 may activate the first camera (e.g., the first camera 411 of FIG. 4) when a function related to the camera is executed, and the first image (e.g., preview image) taken through the first camera 411 may be displayed through a display module (e.g., the display module 160 of FIG. 4). The processor 120 may display the first image and substantially simultaneously move at least one lens (e.g., the zoom lens 601) included in the second camera 412 (e.g., the continuous optical zoom camera) to a configured position (e.g., the second position 642). The processor 120 may move the zoom lens 601 to a second position 642 corresponding to the midpoint of the zoom lens movement area 611 (e.g., the movable section). For example, the configured position (e.g., the second position 642) may be configured to a position (e.g., a position with a relatively short movement distance within a movable range) in which the zoom lens 601 can move relatively quickly. For example, the zoom lens 601 disposed at the second position 642 may have a first position 641 corresponding to a magnification of about 3× 631 and a magnification of about 5× 633.

According to an embodiment of the disclosure, the configured position in which at least one lens is moved in response to the execution of a function related to the camera is not limited to a specific position. The configured position may be determined by considering the movable section of the lens, the movement area of the lens, the movement distance of the lens, the movement time of the lens, the movement speed of the lens, the movement timing of the lens, the distance to the subject (e.g., object) included in the preview image, and/or the user history related to the performance of the zoom function. According to an embodiment of the disclosure, the processor 120, by moving the zoom lens 601 to a configured position, may relatively quickly move the zoom lens 601 to a position corresponding to the specific magnification in response to a signal requesting a zoom function to a specific magnification. According to an embodiment of the disclosure, the processor 120 may acquire a second image relatively quickly using the zoom lens 601 because the zoom lens 601 quickly moves to a position corresponding to a specific magnification. For example, the second image may include a relatively higher definition and quality image than the first image.

Figure 7:
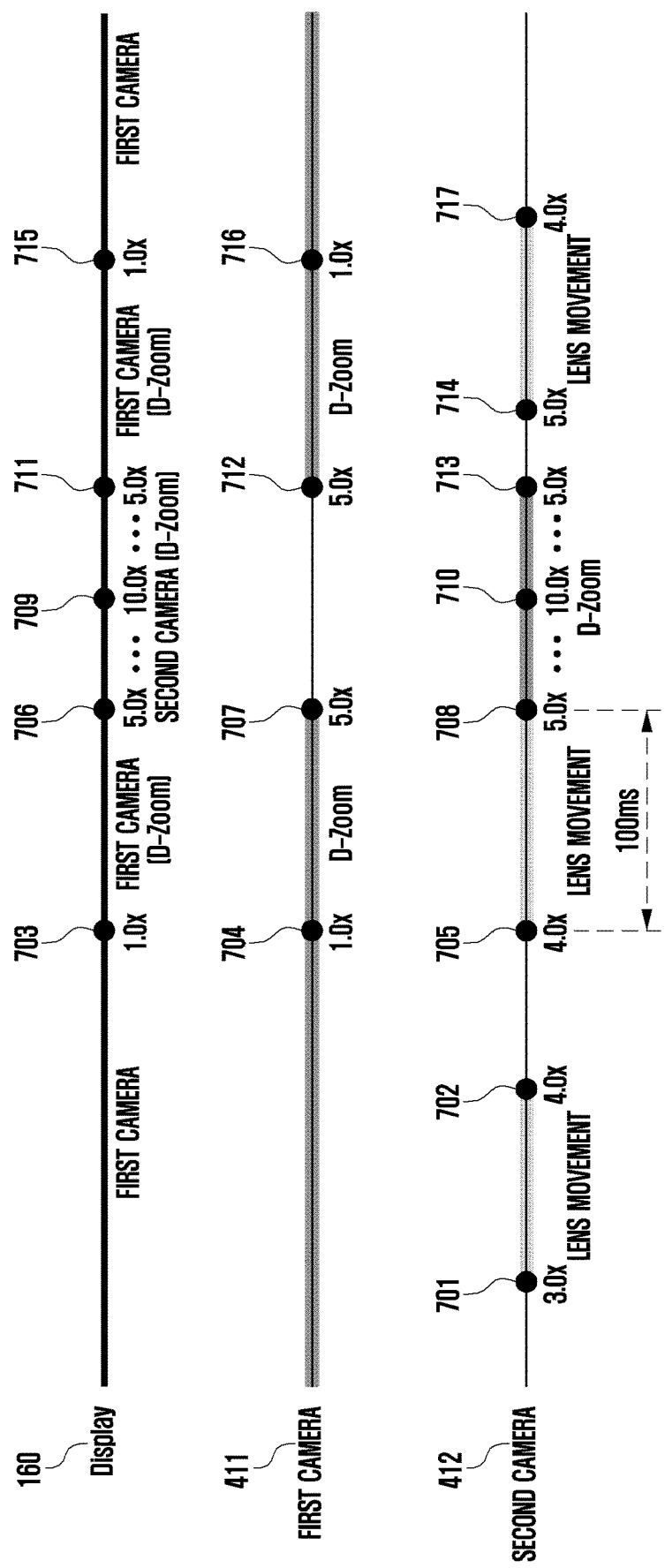
FIG. 7 is a diagram illustrating an operation of an electronic device according to a specific magnification when performing a zoom function based on a first camera and a second camera according to an embodiment of the disclosure.

FIG. 7 is a diagram illustrating an operation of an electronic device according to a specific magnification when performing a zoom function based on the first camera and the second camera according to an embodiment of the disclosure.

The electronic device 101 of FIG. 7 may be at least partially similar to the electronic device 101 of FIG. 1, the electronic device 200 of FIGS. 2A and 2B, and the electronic device 101 of FIG. 4 or may further include other embodiments of the electronic device 101.

Referring to FIG. 7, in the process of performing the zoom function, an image displayed through a display module (e.g., the display module 160 of FIG. 4), an operation of a first camera (e.g., the first camera 411 of FIG. 4), and an operation of a second camera (e.g., the second camera 412 of FIG. 4) are illustrated.

Referring to FIG. 7, the processor of the electronic device 101 (e.g., the processor 120 of FIG. 4) may activate the first camera 411 in response to the execution of a function related to the camera. The processor 120 may display the first image taken using the first camera 411 through the display module 160. For example, the first camera 411, as a camera supporting about 1× magnification, may include a focal length fixed camera (e.g., an ultrawide camera, a wide camera, a tele camera) with a fixed focal length. The processor 120 may display the first image taken based on about 1× magnification. In operation 701, the second camera 412 (e.g., a continuous optical zoom camera) may be disposed in a position where the zoom lens is initially configured (e.g., the default position). For example, the second camera 412 may include a continuous optical zoom camera that performs a zoom function of a specific magnification by physically moving at least one lens (e.g., a zoom lens, an AF lens). The second camera 412 may move at least one lens based on a range of magnifications (e.g., a movable range of the lens) from about 3× magnification to about 5× magnification and may support a zoom function according to a range of magnifications. According to an embodiment of the disclosure, the processor 120 may move the position of the lens of the second camera 412 to a configured position (e.g., the preset first position) in response to the execution of a function related to the camera.

In operation 702, the processor 120 may move the lens of the second camera 412 to a configured first position (e.g., a position corresponding to about 4× magnification) in a situation where the first image is being displayed through the display module 160. According to an embodiment of the disclosure, the second camera 412 may include a continuous optical zoom camera supporting a range of magnifications while the lens is physically moved. Since the processor 120 takes time according to the movement of the lens of the second camera 412, the position in which the lens can move relatively quickly may be configured as the first position. For example, the processor 120 may configure an intermediate position (e.g., a position corresponding to about 4× magnification) of the movable section (e.g., from a position (e.g., a starting position of the lens) corresponding to about 3× magnification to a position (e.g., a ending position of the lens) corresponding to about 5× magnification, a movable range of the lens) of the lens as the first position.

In operations 703, 704, and 705, the processor 120 may identify a signal requesting a zoom function for performing a zoom function to about 5× magnification. For example, the second camera 412 may support a zoom function from about 3× magnification to about 5× magnification. The lens of the second camera 412 may be located in the preset first position (e.g., a position corresponding to about 4× magnification). In operation 703, the processor 120 may perform a digital zoom function of about 5× magnification based on the first image being displayed through the display module 160. In operation 706, the processor 120 may display a first image enlarged by about 5× magnification through the display module 160. In operation 704, the processor 120 may perform a digital zoom function of about 5× magnification based on the first image taken through the first camera 411. In operation 707, the first camera 411 may be under performing a digital zoom function of about 5× magnification. In operation 705, the processor 120 may physically move the lens included in the second camera 412 to a second position corresponding to about 5× magnification. For example, when the lens of the first position moves to the second position, it may take about 100 ms. In operation 708, the processor 120 may acquire a second image using a zoom lens moved to the second position. The processor 120 may acquire a second image based on a continuous optical zoom function.

According to an embodiment of the disclosure, a first time it takes for the lens to move from the preset first position to the second position is shorter than a second time it takes for the lens to move from the starting position to the second position. According to an embodiment of the disclosure, the processor 120 may move the lens of the second camera 412 to the preset first position in response to the execution of a function related to the camera. The processor 120 may move the lens relatively faster in response to an input requesting the zoom function.

In operation 706, the processor 120 may display a second image acquired through the second camera 412 by the display module 160. The processor 120 may change the enlarged first image (e.g., a first preview image) based on the digital zoom function to the second image (e.g., a second preview image) acquired based on the continuous optical zoom function and display it.

In operations 706, 707, and 708, the processor 120 may identify a signal requesting a zoom function for performing a zoom function from about 5× magnification to about 10× magnification. For example, the second camera 412 may perform a zoom function at about 10× magnification based on the digital zoom function. For example, the second image may be at least partially enlarged based on about 10× magnification. The lens of the second camera 412 may remain located in a second position (e.g., a position corresponding to about 5× magnification). In operation 709, the processor 120 may perform a digital zoom function of about 10× magnification based on the second image being displayed through the display module 160. In operation 710, the second camera 412 may be under performing a digital zoom function of about 10× magnification.

In operations 709 and 710, the processor 120 may identify a signal requesting a zoom function for performing a zoom function from about 10× magnification to about 5× magnification. The lens of the second camera 412 may acquire a second image while positioned at a second position (e.g., a position corresponding to about 5× magnification). In operation 711, the processor 120 may perform a digital zoom function of about 5× magnification based on a second image (e.g., a second image enlarged by a digital zoom function of about 10× magnification) being displayed through the display module 160. For example, the second image may be at least partially reduced in the enlarged state. In operation 713, the second camera 412 may be under performing a continuous optical zoom function of about 5× magnification.

In operations 711, 712, and 713, the processor 120 may identify a signal requesting a zoom function for performing a zoom function from about 5× magnification to about 1× magnification. In operation 711, the processor 120 may change the second image (e.g., an image acquired through the second camera 412) being displayed through the display module 160 to a first image (e.g., an image acquired through the first camera 411, an image in which the digital zoom function is performed at about 5× magnification). In operation 711, the processor 120 may perform a zoom function of the first image acquired through the first camera 411 from about 5× magnification to about 1× magnification. In operation 712, the first camera 411 may perform a digital zoom function that reduces from about 5× magnification to about 1× magnification based on the acquired first image. In operation 713, the second camera 412 may identify a signal requesting a zoom function from about 5× magnification to about 1× magnification (e.g., a magnification not supported by the second camera 412). In operation 714, the second camera 412 may physically move the lens included in the second camera 412 from a second position corresponding to about 5× magnification to a position corresponding to about 4× magnification.

In operations 715 and 716, the processor 120 may acquire a first image based on about 1× magnification using the first camera 411 and display the acquired first image through the display module 160.

Figure 8A:
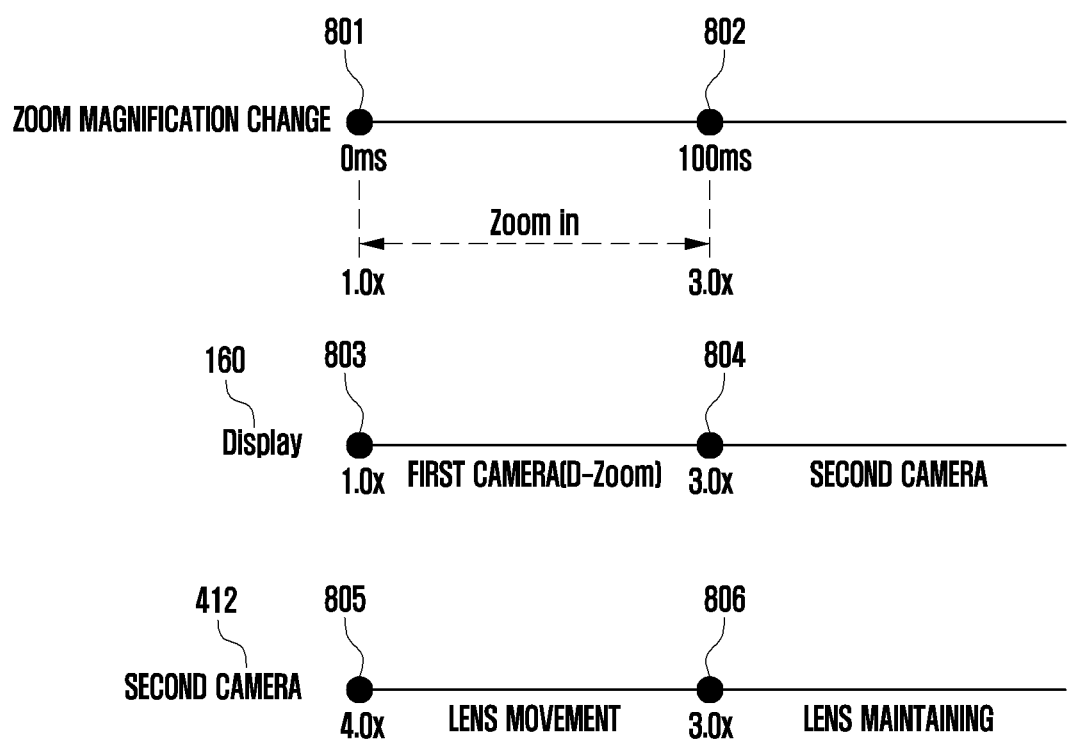
FIG. 8A is a diagram illustrating a lens movement of a second camera when performing a zoom function from about 1× magnification to about 3× magnification according to an embodiment of the disclosure.
Figure 8B:
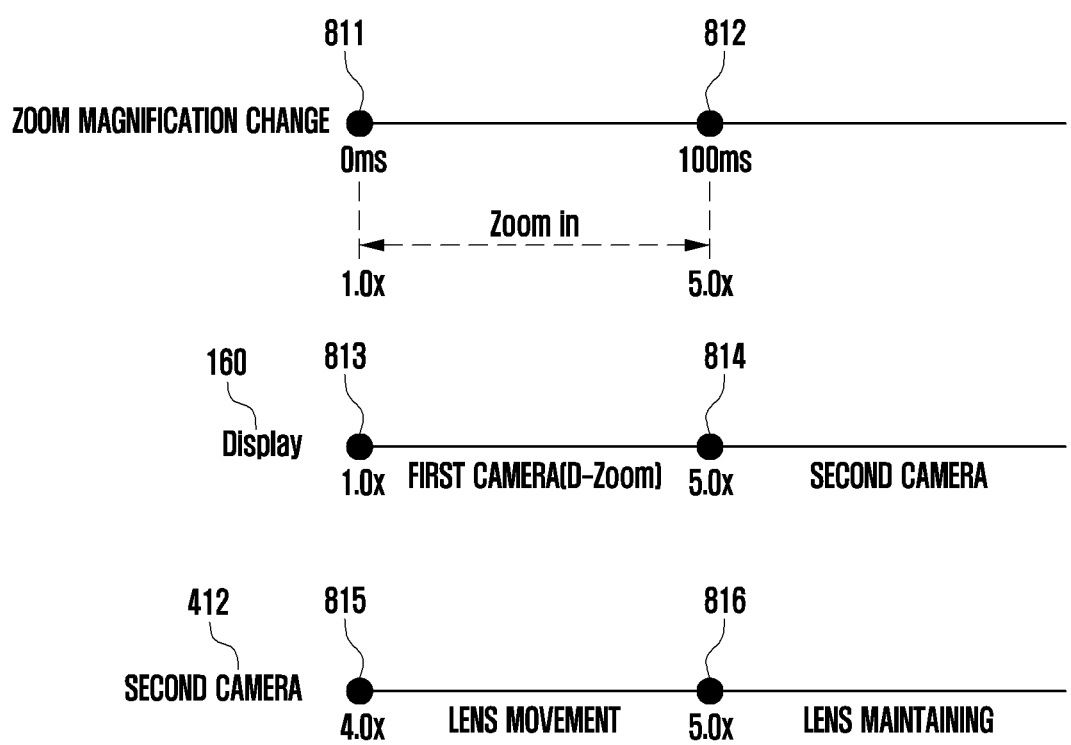
FIG. 8B is a diagram illustrating a lens movement of a second camera when performing a zoom function from about 1× magnification to about 5× magnification according to an embodiment of the disclosure.
Figure 8C:
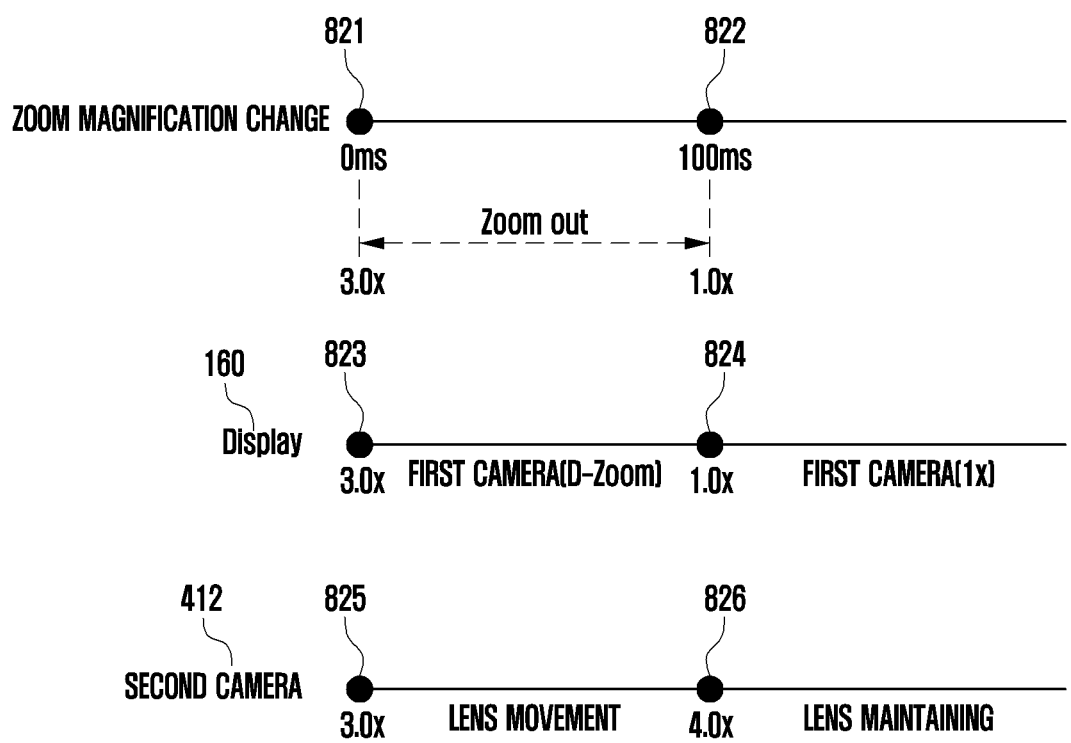
FIG. 8C is a diagram illustrating a lens movement of a second camera when performing a zoom function from about 3× magnification to about 1× magnification according to an embodiment of the disclosure.

FIG. 8A is a diagram illustrating a lens movement of a second camera when performing a zoom function from about 1× magnification to about 3× magnification according to an embodiment of the disclosure. FIG. 8B is a diagram illustrating a lens movement of a second camera when performing a zoom function from about 1× magnification to about 5× magnification according to an embodiment of the disclosure. FIG. 8C is a diagram illustrating a lens movement of a second camera when performing a zoom function from about 3× magnification to about 1× magnification according to an embodiment of the disclosure.

The electronic device 101 of FIGS. 8A, 8B, and 8C may be at least partially similar to the electronic device 101 of FIG. 1, the electronic device 200 of FIGS. 2A and 2B, and the electronic device 101 of FIG. 4.

Referring to FIGS. 8A, 8B, and 8C, in the process of performing the zoom function, a process of changing the zoom magnification, an image displayed through a display module (e.g., the display module 160 of FIG. 4), and an operation of a second camera (e.g., the second camera 412 of FIG. 4, a continuous optical zoom camera) are illustrated.

Referring to FIG. 8A, the processor of the electronic device 101 in operation 801 (e.g., the processor 120 of FIG. 4) may identify a request signal for performing a zoom function (e.g., a zoom in) from about 1× magnification to about 3× magnification in relation to an image displayed through the display module 160. In operation 803, the processor 120 may display a first image taken at about 1× magnification using a first camera (e.g., the first camera 411 of FIG. 4) through the display module 160. In operation 805, the second camera 412 may be in a state of being moved to the first position (e.g., a position corresponding to about 4× magnification) in which the zoom lens is configured. For example, the processor 120 may move the zoom lens of the second camera 412 to a configured first position in response to the execution of a function related to the camera.

In operations 801 and 802, the processor 120 may perform a zoom function (e.g., a zoom in) in which the image is enlarged from about 1× magnification to about 3× magnification. For example, the processor 120 may display an image while enlarging it at about 1× magnification to about 3× magnification for about 100 ms. In operations 803 and 804, the processor 120 may perform a digital zoom function at about 3× magnification based on the first image taken at about 1× magnification using the first camera 411. For example, the processor 120 may display a situation in which at least a portion of the first image is progressively enlarged from about 1× magnification to about 3× magnification through the display module 160. In operations 805 and 806, the processor 120 may move the lens of the second camera 412 from a configured first position (e.g., a position corresponding to about 4× magnification) to a second position (e.g., a position corresponding to about 3× magnification). For example, the lens of the second camera 412 may be moved from the first position to the second position for about 100 ms.

In operation 804, the processor 120 may display a second image taken at about 3× magnification using the second camera 412 through the display module 160. In operation 806, the processor 120 may maintain the position of the lens of the second camera 412 in the second position.

Referring to FIG. 8A, the time required for a change in zoom magnification is initiated at about 100 ms but is not limited thereto. For example, the execution speed of the digital zoom operation through the first camera 411 may be faster than the execution speed of the optical zoom operation through the second camera 412.

According to an embodiment of the disclosure, when the zoom function to a specific magnification is performed, the electronic device 101 may display an image in which at least a portion of the first image is enlarged to a specific magnification through the display module 160. The electronic device 101 may continue to display an image enlarged to a specific magnification through the display module 160 until the lens of the second camera 412 is moved to a position corresponding to the specified magnification. According to an embodiment of the disclosure, the electronic device 101 may acquire a second image using the second camera 412 in response to a situation in which the lens movement of the second camera 412 is completed (e.g., the operation 806), and in operation 804, the display module 160 may display the acquired second image.

Referring to FIG. 8B, in operation 811, the processor 120 may identify a request signal for performing a zoom function (e.g., a zoom in) from about 1× magnification to about 5× magnification in relation to the image displayed through the display module 160. In operation 813, the processor 120 may display the first image taken at about 1× magnification using the first camera 411 through the display module 160. In operation 815, the second camera 412 may be moved to the first position (e.g., a position corresponding to about 4× magnification) where the lens is configured. For example, the processor 120 may move the lens of the second camera 412 to a configured first position in response to the execution of a function related to the camera.

In operations 811 and 812, the processor 120 may perform a zoom function (e.g., a zoom in) in which the image is enlarged from about 1× magnification to about 5× magnification. For example, the processor 120 may display an image while enlarging it at about 1× magnification to about 5× magnification for about 100 ms. In operations 813 and 814, the processor 120 may perform a digital zoom function at about 5× magnification based on the first image taken at about 1× magnification using the first camera 411. For example, the processor 120 may display a situation in which at least a portion of the first image is progressively enlarged from about 1× magnification to about 5× magnification through the display module 160. In operations 815 and 816, the processor 120 may move the lens of the second camera 412 from a configured first position (e.g., a position corresponding to about 4× magnification) to a third position (e.g., a position corresponding to about 5× magnification). For example, the lens of the second camera 412 may be moved from the first position to the third position for about 100 ms.

In operation 814, the processor 120 may display a second image taken at about 5× magnification using the second camera 412 through the display module 160. In operation 816, the processor 120 may maintain the position of the lens of the second camera 412 to the third position.

Referring to FIG. 8B, the time required for a change in zoom magnification is disclosed as about 100 ms but is not limited thereto. For example, the execution speed of the digital zoom operation through the first camera 411 may be faster than the execution speed of the optical zoom operation through the second camera 412.

Referring to FIG. 8C, in operation 821, the processor 120 may identify a request signal for performing a zoom function (e.g., a zoom out) from about 3× magnification to about 1× magnification in relation to the image displayed through the display module 160. In operation 823, the processor 120 may display the first image taken at about 3× magnification using the first camera 411 through the display module 160. For example, the first image enlarged to about 3× magnification may include an image taken at about 1× magnification using the first camera 411 and enlarged to about 3× magnification. In operation 825, the second camera 412 may be in a state of being moved to a second position (e.g., a position corresponding to about 3× magnification) where the lens is configured. For example, the processor 120 may be in a state of displaying a second image taken using the second camera 412 disposed in the second position through the display module 160 until identifying the signal requesting a zoom function at operation 821.

In operations 821 and 822, the processor 120 may perform a zoom function (e.g., a zoom out) in which the image is reduced from about 3× magnification to about 1× magnification. For example, the processor 120 may display an image for about 100 ms while reducing it from about 3× magnification to about 1× magnification. In operations 823 and 824, the processor 120 may perform a digital zoom function that reduces the first image taken using the first camera 411 from about 3× magnification to about 1× magnification. For example, the processor 120 may display a situation in which the first image is progressively reduced from about 3× magnification to about 1× magnification through the display module 160. In operations 825 and 826, the processor 120 may move the lens of the second camera 412 from a second position (e.g., a position corresponding to about 3× magnification) to a position (e.g., a position corresponding to about 4× magnification). For example, the lens of the second camera 412 may be moved from the second position to the first position for about 100 ms.

In operation 824, the processor 120 may display the first image taken at about 1× magnification using the first camera 411 through the display module 160. In operation 826, the processor 120 may maintain the position of the lens of the second camera 412 in the first position.

Referring to FIG. 8C, the time required for a change in zoom magnification is disclosed as about 100 ms but is not limited thereto. For example, the execution speed of the digital zoom operation through the first camera 411 may be faster than the execution speed of the optical zoom operation through the second camera 412.

Figure 8D:
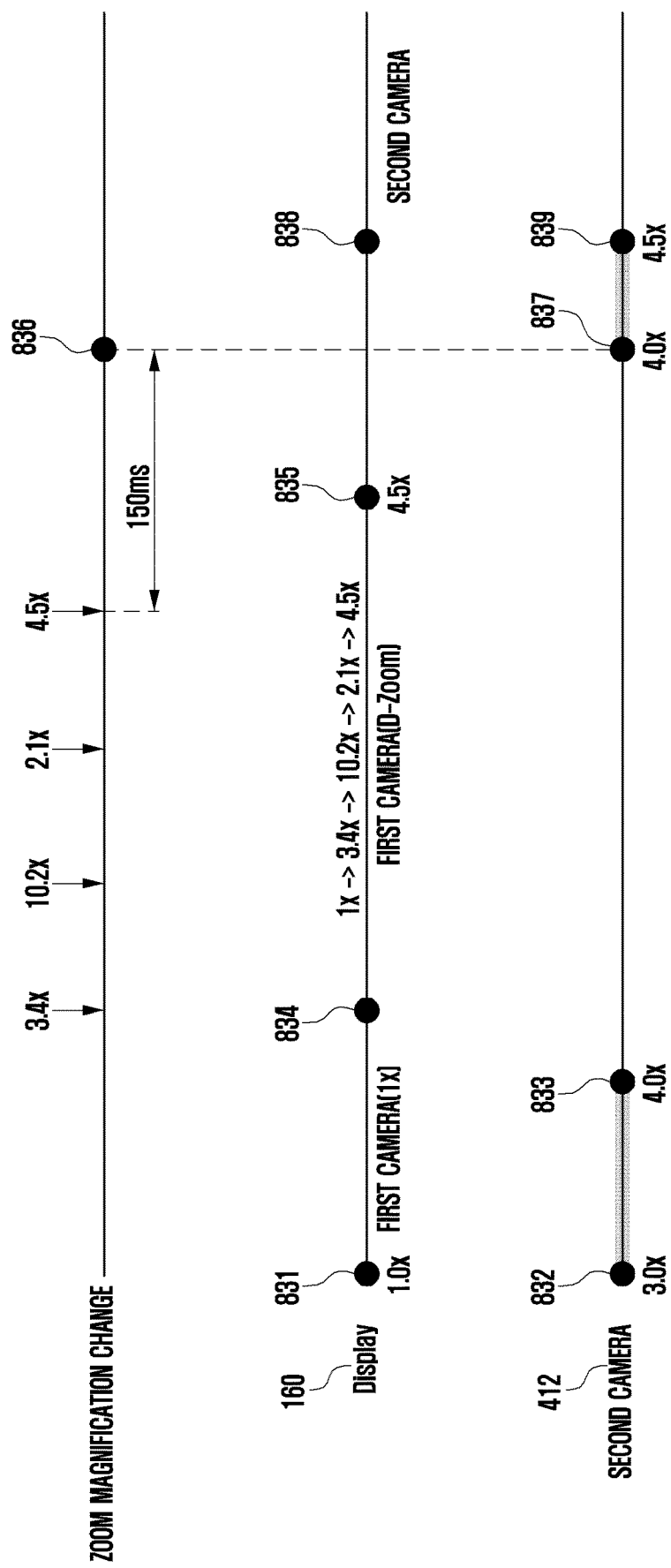
FIG. 8D is a diagram illustrating an operation of an electronic device when a magnification change occurs quickly while a zoom function is performed based on a first camera and a second camera according to an embodiment of the disclosure.

FIG. 8D is a diagram illustrating an operation of an electronic device when a magnification change occurs quickly while a zoom function is performed based on a first camera and a second camera according to an embodiment of the disclosure.

Referring to FIG. 8D, in the process of performing the zoom function, a process of changing the zoom magnification, an image displayed through a display module (e.g., the display module 160 of FIG. 4), and an operation of a second camera (e.g., the second camera 412 of FIG. 4, a continuous optical zoom camera) are illustrated.

Referring to FIG. 8D, in operation 831, the processor of the electronic device 101 (e.g., the processor 120 of FIG. 4) may activate the first camera (e.g., the first camera 411 of FIG. 4) supporting about 1× magnification in response to the execution of a function related to the camera. The processor 120 may display the first image taken at about 1× magnification through the display module 160 using the first camera 411. In operation 832, the processor 120 may activate a second camera 412 supporting a range of magnification, from about 3× magnification to about 5× magnification, in response to the execution of a function related to a camera. For example, the second camera 412 may be disposed in a position where the lens (e.g., the zoom lens) is initially configured (e.g., the default position, a starting position, a position corresponding to about 3× magnification).

In operations 832 and 833, the processor 120 may move the lens of the second camera 412 from the initially configured position (e.g., a position corresponding to about 3× magnification, a starting position) to a first position (e.g., a position corresponding to about 4× magnification, a preset first position) in response to an execution of a function related to a camera.

Referring to FIG. 8D, in the electronic device 101 from operation 834 to operation 835, zoom change requests (e.g., an input requesting zoom change), such as a pinch zoom may occur successively. For example, the zoom change request may include a pinch zoom input according to the touch input and an interface (e.g., a zoom bar, a zoom circle) input for changing to a specific zoom magnification. For example, a zoom in function may be performed from about 1× magnification to about 3.4× magnification, a zoom in function may be performed from about 3.4× magnification to about 10.2× magnification, a zoom out function is performed from about 10.2× magnification to about 2.1× magnification, and a zoom in function is performed from about 2.1× magnification to about 4.5× magnification. For example, operations 834 and 835 may include a state in which continuous pinch zoom occurs while the user input does not fall from the display module 160.

In operations 834 and 835, the processor 120 may perform a digital zoom function (e.g., a zoom in function, a zoom out function) based on the first image taken using the first camera 411, and it may display the first image enlarged or reduced by the digital zoom function through the display module 160.

In operations 834 and 835, the processor 120 may identify the magnification in real time according to a continuous zoom change request, but it may maintain the position (e.g., a preset first position) of the lens of the second camera 412 even if a continuous zoom change request occurs. In operations 834 and 835, the processor 120 may move the position of the lens of the second camera 412 from the preset first position to a position corresponding to a magnification which the zoom change request is stopped when a predetermined time (e.g., about 150 ms) elapses since the zoom change request is stopped.

For example, when a predetermined time (e.g., about 150 ms) has elapsed based on the time when the zoom change request was last made (e.g., at the time of a magnification change of about 4.5×), in operations 836, 837, and 839, the processor 120 may move the lens of the second camera 412 from the preset first position (e.g., a position corresponding to about 4× magnification) to a fourth position (e.g., a position corresponding to about 4.5× magnification). In operation 838, the processor 120 may display a second image taken using the second camera 412 (e.g., with the lens shifted to the fourth position) through the display module 160.

According to an embodiment of the disclosure, when a zoom change request occurs successively, if the position of the lens (e.g., the zoom lens) of the second camera 412 is successively changed in real time in response to the zoom change request, a significant amount of current may be consumed because of the position changes of the lens. According to an embodiment of the disclosure, the electronic device 101 may move the lens to a position corresponding to the zoom change request in response to the predetermined time elapsed based on the time when the zoom change request occurs.

According to an embodiment, in a situation where a zoom change request (e.g., an input requesting a zoom change) occurs continuously, in the case that the time required for the zoom change request exceeded a preset threshold, the processor 120 may move the lens to the initially configured position (e.g., the starting position, the default position). For example, in the case that the lens of the second camera 412 is moved to the configured first position and the time required for the zoom change request exceeded a preset threshold, the processor 120 may move the lens from the configured first position to the starting position of the lens.

According to an embodiment, in a situation where a zoom change request occurs continuously, in the case that the zoom magnification according to the zoom change request is gradually reduced from a magnification greater than or equal to a certain range (e.g., from about 3× to about 5×) supported by the second camera 412, the processor 120 may move the lens included in the second camera 412 to a point (e.g., the ending position of the lens) corresponding to the maximum magnification (e.g., about 5 magnification) within a certain range. For example, the processor 120 may identify a situation where the zoom magnification in response to the zoom change request gradually decreases from about 10× to about 5×, and, in response to the identified situation, may move the lens included in the second camera 412 from the configured first position (e.g., a position corresponding to about 4 magnification) to a point (e.g., the ending position of the lens) corresponding to about 5 magnification. For example, in the case that the zoom magnification is adjusted to about 5× in response to a zoom change request, the processor 120 may display a second image taken using the second camera 412.

According to an embodiment, in a situation where a zoom change request occurs continuously, in the case that the zoom magnification according to the zoom change request is gradually increased from a magnification less than or equal to a certain range (e.g., from about 3× to about 5×) supported by the second camera 412, the processor 120 may move the lens included in the second camera 412 to a point (e.g., the starting point of the lens, the default position of the lens) corresponding to the minimum magnification (e.g., about 3 magnification) within a certain range. For example, the processor 120 may identify a situation where the zoom magnification in response to the zoom change request gradually increases from about 1× to about 3×, and, in response to the identified situation, may move the lens included in the second camera 412 from the configured first position (e.g., a position corresponding to about 4 magnification) to a point corresponding to about 3 magnification (e.g., the starting point of the lens). For example, in the case that the zoom magnification is adjusted to about 3× in response to the zoom change request, the processor 120 may display the second image taken using the second camera 412.

According to an embodiment, in a situation where a zoom change request occurs continuously, the processor 120 may detect whether the magnification in response to the zoom change request gradually increases or gradually decreases, and in response to the detection, may change the position of the lens from the configured first position to a specific position (e.g., the 1-1 position corresponding to the minimum magnification, and the 1-2 position corresponding to the maximum magnification). For example, in the case that the zoom change request gradually decreases at a magnification exceeding the range of the supportable magnification of the lens (e.g., the movable section of the lens), the processor 120 may change the position of the lens from the configured first position to the 1-2 position corresponding to the maximum magnification of the lens. For another example, in the case that the zoom change request gradually increases at a magnification that is less than the range of supportable magnification of the lens (e.g., the movable section of the lens), the processor 120 may change the position of the lens from the configured first position to the 1-1 position corresponding to the minimum magnification of the lens.

According to an embodiment, the electronic device 101 may move the lens to a configured position (e.g., a configured first position, a 1-1 position, a 1-2 position) in advance in a situation where a zoom change request occurs, and the time required for physical movement of the lens can be reduced.

Figure 9A:
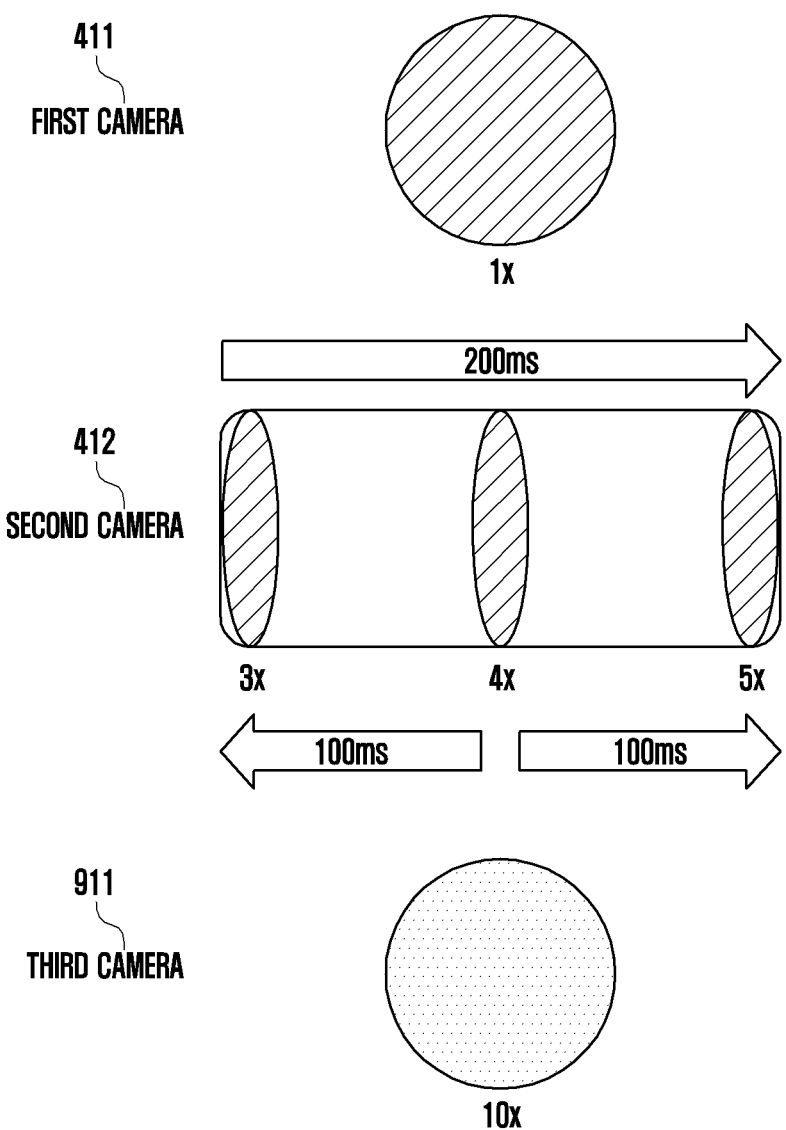
FIG. 9A is a diagram illustrating a situation in which a zoom function is performed based on a plurality of focal length fixed cameras and a continuous optical zoom camera according to an embodiment of the disclosure.
Figure 9B:
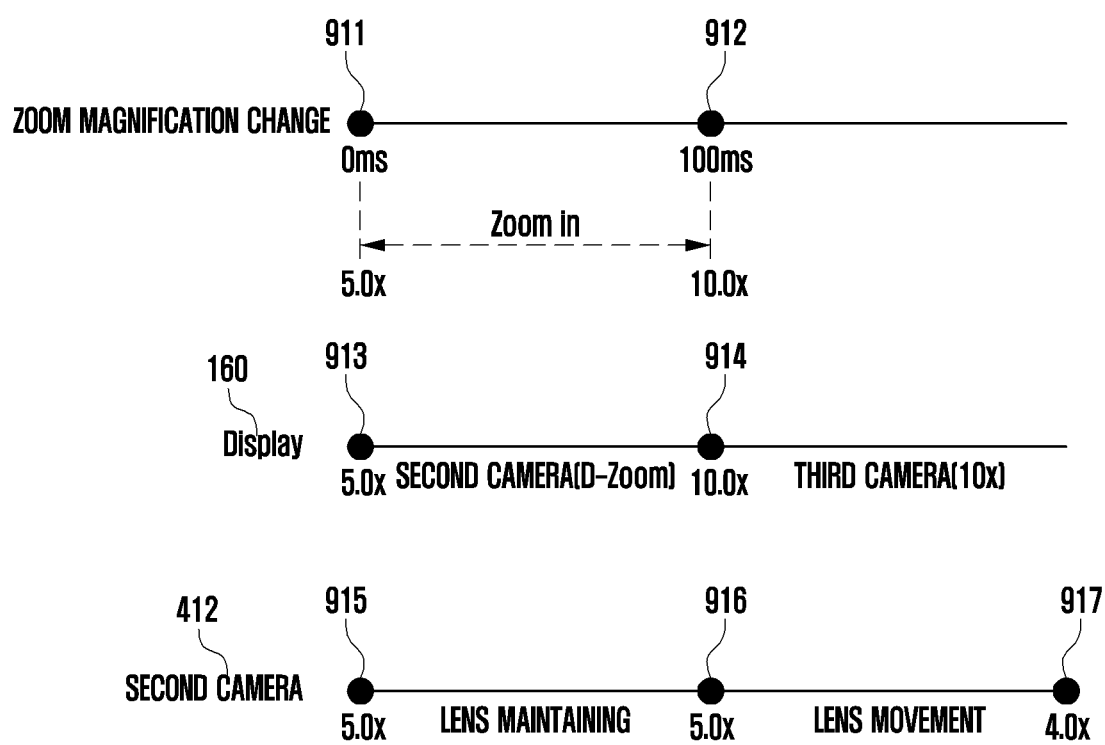
FIG. 9B is a diagram illustrating an operation of a focal length fixed camera and a continuous optical zoom camera when performing a zoom function from about 5× magnification to about 10× magnification according to an embodiment of the disclosure.
Figure 9C:
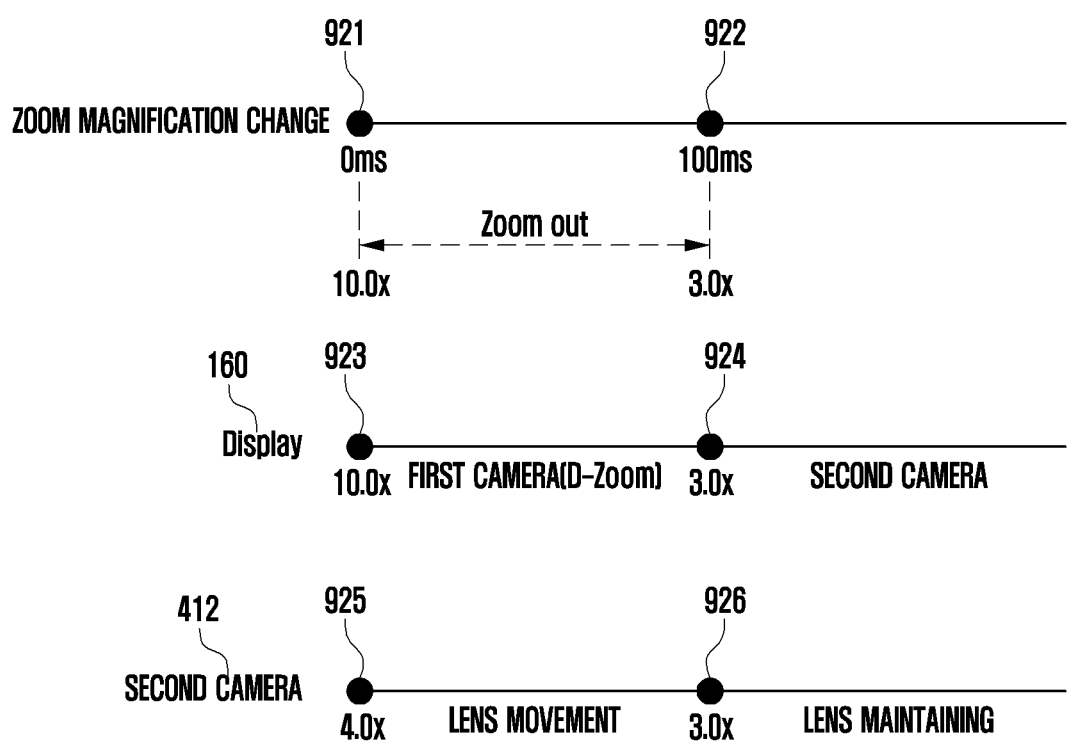
FIG. 9C is a diagram illustrating an operation of a focal length fixed camera and a continuous optical zoom camera when performing a zoom function from about 10× magnification to about 3× magnification according to an embodiment of the disclosure.

FIG. 9A is a diagram illustrating a situation in which a zoom function is performed based on a plurality of focal length fixed cameras and a continuous optical zoom camera according to an embodiment of the disclosure. FIG. 9B is a diagram illustrating an operation of a focal length fixed camera and a continuous optical zoom camera when performing a zoom function from about 5× magnification to about 10× magnification according to an embodiment of the disclosure. FIG. 9C is a diagram illustrating an operation of a focal length fixed camera and a continuous optical zoom camera when performing a zoom function from about 10× magnification to about 3× magnification according to an embodiment of the disclosure.

The electronic device 101 of FIGS. 9A, 9B, and 9C may be at least partially similar to the electronic device 101 of FIG. 1, the electronic device 200 of FIGS. 2A and 2B, and the electronic device 101 of FIG. 4 or may further include other embodiments of the electronic device 101.

Referring to FIG. 9A, the electronic device 101 may include a plurality of focal length fixed cameras (e.g., a first camera (e.g., the first camera 411 of FIG. 4), a third camera 910 and a continuous optical zoom camera (e.g., the second camera 412 of FIG. 4). For example, the first camera 411 may support about 1× magnification, and the third camera 910 may support about 10× magnification. The second camera 412 may support a zoom function from about 3× magnification to about 5× magnification while at least one lens (e.g., a zoom lens) is physically moved.

Referring to FIGS. 9B and 9C, in the process of performing the zoom function, a process of changing the zoom magnification, an image displayed through the display module (e.g., the display module 160 of FIG. 4), and an operation of the second camera 412 (e.g., a continuous optical zoom camera) are illustrated.

Referring to FIG. 9B, the processor of the electronic device 101 (e.g., the processor 120 of FIG. 4) in operation 911 may identify a request signal for performing a zoom function (e.g., a zoom in) from about 5× magnification to about 10× magnification in relation to an image displayed through the display module 160. In operation 913, the processor 120 may display a second image taken at about 5× magnification using the second camera 412 through the display module 160. In operation 915, the second camera 412 may be moved to a third position (e.g., a position corresponding to about 5× magnification) where the zoom lens is configured.

In operations 911 and 912, the processor 120 may perform a zoom function (e.g., a zoom in) in which the image is enlarged from about 5× magnification to about 10× magnification for about 100 ms. In operations 913 and 914, the processor 120 may perform a digital zoom function at about 10× magnification based on a second image taken at about 5× magnification using the second camera 412. In operations 915 and 916, the processor 120 may maintain the third position in which the zoom lens of the second camera 412 is disposed.

In operation 914, the processor 120 may display a third image taken at about 10× magnification using the third camera 910 through the display module 160. In operations 916 and 917, the processor 120 may move the zoom lens disposed in the third position (e.g., a position corresponding to about 5× magnification) to the first position (e.g., a position corresponding to about 4× magnification).

Referring to FIG. 9C, in operation 921, the processor 120 may identify a request signal for performing a zoom function (e.g., a zoom out) from about 10× magnification to about 3× magnification in relation to the image displayed through the display module 160. In operation 923, the processor 120 may display a first image (e.g., an image in which a digital zoom function is performed at about 10× magnification) taken using the first camera 411 through the display module 160. In operation 925, the second camera 412 may be moved to the first position in which the zoom lens is configured (e.g., a position corresponding to about 4× magnification).

In operations 921 and 922, the processor 120 may perform a zoom function (e.g., a zoom out) in which the image is reduced from about 10× magnification to about 3× magnification for about 100 ms. In operations 923 and 924, the processor 120 may perform a zoom function at about 3× magnification based on a first image (e.g., an image in which the digital zoom function is performed at about 10× magnification) taken using the first camera 411. In operations 925 and 926, the processor 120 may move the zoom lens of the second camera 412 from a configured first position (e.g., a position corresponding to about 4× magnification) to a second position (e.g., a position corresponding to about 3× magnification). For example, the zoom lens may be moved from the first position to the second position for about 100 ms.

In operation 924, the processor 120 may display a second image taken at about 3× magnification using the second camera 412 through the display module 160. According to an embodiment of the disclosure, when the zoom magnification is changed, the processor 120 may identify whether the zoom magnification to be changed is supported by the second camera 412 (e.g., a continuous optical zoom camera). If the modified zoom magnification is a magnification supportable by the second camera 412, the processor 120 may move at least one lens (e.g., a zoom lens) included in the second camera 412 to a position corresponding to the desired zoom magnification, and through the moved lens, a second image may be acquired. For example, the acquired second image may include an image in which an optical zoom function is performed based on the changed zoom magnification.

A method according to an embodiment may include, in response to the execution of a function related to the first camera (e.g., the first camera 411 of FIG. 4), displaying the first preview image of the first magnification acquired through the first camera through the display (e.g., the display module 160 of FIGS. 1 and/or 4); moving, while the first preview image of the first magnification is displayed, the lens included in the second camera (e.g., the second camera 412 of FIG. 4) from a starting position to the preset first position configured based on a movable range of the lens; moving, in response to an input requesting a zoom function to a second magnification, the lens of the preset first position to a second position corresponding to the second magnification; and acquiring a second preview image corresponding to the second magnification through the second camera 412 based on the lens moved to the second position.

The method according to an embodiment may further include identifying whether the second magnification is included in a range of magnifications supported by the second camera 412 in response to a signal requesting a zoom function to the second magnification and, in the case that the second magnification is included in a range of magnification, moving the lens included in the second camera 412 to a second position corresponding to the second magnification.

The method according to an embodiment may further include maintaining the lens included in the second camera 412 in a configured first position when the second magnification is not included in a range of magnifications.

The method according to an embodiment may further include displaying at least a portion of the first preview image by enlarging the second magnification in response to an input requesting a zoom function to the second magnification and moving the lens included in the second camera 412 to a second position corresponding to the second magnification when the predetermined time exceeds from the time of displaying the first preview image enlarged to the second magnification.

The method according to an embodiment may further include changing the first preview image enlarged by the second magnification to a second preview image corresponding to the second magnification and displaying the second preview image through the display 160, in a state where the second preview image corresponding to the second magnification is displayed, in response to an input requesting a zoom function to the first magnification, changing the second preview image to the first preview image enlarged by the second magnification and displaying the first preview image, and reducing, by the first magnification, the first preview image enlarged by the second magnification and display the first preview image.

The method according to an embodiment may further include moving the lens included in the second camera 412 disposed at the second position to the configured first position in response to an input requesting a zoom function to the first magnification while the second preview image corresponding to the second magnification is displayed.

The method according to an embodiment may further include, in a state where the second preview image corresponding to the second magnification acquired through the second camera 412 is displayed, in response to an input requesting a zoom function to the third magnification, enlarging the second preview image by the third magnification and displaying the second preview image, acquiring a third preview image corresponding to the third magnification using the third camera 910 supporting the zoom function corresponding to the third magnification, and changing the second preview image enlarged by the third magnification to the third preview image and displaying the third preview image.

According to an embodiment of the disclosure, the configured first position may be configured based on at least one of the movable section of the lens included in the second camera 412, the movement distance of the lens, the movement time of the lens, the movement speed of the lens, the movement timing of the lens, the distance to the object included in the first image, and the user history related to the performance of the zoom function.

According to an embodiment of the disclosure, the first camera 411 may include a focal length fixed camera having a fixed focal length for acquiring an image corresponding to the first magnification, and the second camera 412 may include a continuous optical zoom camera for acquiring an image corresponding to a range of magnifications while the at least one lens is physically moved.

The method according to an embodiment may include performing a digital zoom function based on the first preview image acquired using the first camera 411 in response to a signal requesting a zoom function to the second magnification and displaying a first preview image in which at least a portion of the first preview image is enlarged to the second magnification.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first camera;
a second camera including a lens moving within a movable range;
a display;
a processor; and
memory operatively connected to the processor and configured to store instructions,
wherein the electronic device is configured to execute the instructions to:
  display a first preview image of a first magnification acquired through the first camera through the display in response to an execution of a function related to the first camera,
  move, while the first preview image of the first magnification is displayed, the lens included in the second camera from a starting position to a preset first position configured based on the movable range of the lens,
  move, in response to an input requesting a zoom function to a second magnification, the lens of the preset first position to a second position corresponding to the second magnification, and
  acquire a second preview image corresponding to the second magnification through the second camera based on the lens moved to the second position,
  wherein a first time required for the lens to move from the preset first position to the second position is shorter than a second time required for the lens to move from the starting position to the second position.

2. The electronic device of claim 1, wherein the electronic device is further configured to execute the instructions to:
  identify whether the second magnification is included in a range of magnifications supported by the second camera in response to the input requesting the zoom function to the second magnification,
  move the lens included in the second camera to the second position corresponding to the second magnification when the second magnification is included in a range of magnifications, and
  maintain the lens included in the second camera in the preset first position when the second magnification is not included in the magnification of a certain range.

3. The electronic device of claim 2, wherein the electronic device is further configured to execute the instructions to:
  enlarge at least a portion of the first preview image by the second magnification and display the first preview image in response to the input requesting the zoom function to the second magnification, and move the lens included in the second camera to the second position corresponding to the second magnification when a predetermined time is exceeded from a time of displaying the first preview image enlarged to the second magnification.

4. The electronic device of claim 3, wherein the electronic device is further configured to execute the instructions to:
change the first preview image enlarged to the second magnification to the second preview image corresponding to the second magnification and display the second preview image through the display,
change the second preview image to the first preview image enlarged by the second magnification and display the second preview image in response to the input requesting the zoom function to the first magnification in a state where the second preview image corresponding to the second magnification is displayed, and
reduce, by the first magnification, the first preview image enlarged by the second magnification and display the first preview image.

5. The electronic device of claim 4, wherein the electronic device is further configured to execute the instructions to:
move the lens included in the second camera disposed at the second position to the preset first position in response to the input requesting the zoom function to the first magnification in a state where the second preview image corresponding to the second magnification is displayed.

6. The electronic device of claim 5, further comprising:
a third camera for acquiring a third preview image corresponding to a third magnification,
wherein the electronic device is further configured to execute the instructions to:
enlarge the second preview image by the third magnification and display the second preview image in response to the input requesting the zoom function to the third magnification in a state where the second preview image corresponding to the second magnification acquired through the second camera is displayed,
acquire the third preview image corresponding to the third magnification using the third camera, and
change the second preview image enlarged by the third magnification to the third preview image and display the second preview image.

7. The electronic device of claim 1, wherein the preset first position is configured based on at least one of a movable section of the lens included in the second camera, a movement distance of the lens, a movement time of the lens, a movement speed of the lens, a movement timing of the lens, a distance to an object included in the first preview image, or a user history related to a performance of the zoom function.

8. The electronic device of claim 1,
wherein the first camera comprises a focal length fixed camera which has a fixed focal length and acquires an image corresponding to the first magnification, and
wherein the second camera comprises a continuous optical zoom camera in which at least one lens is physically moved and which acquires an image corresponding to a certain range of magnification.

9. The electronic device of claim 8, wherein the at least one lens comprises at least one of a zoom lens performing a zoom function corresponding to a specific magnification or an auto focus (AF) lens corresponding to a specific magnification based on a disposition position of the zoom lens.

10. The electronic device of claim 9, wherein the electronic device is further configured to execute the instructions to:
perform a digital zoom function based on the first preview image acquired using the first camera in response to the input requesting the zoom function to the second magnification, and
display the first preview image in which at least a portion of the first preview image is enlarged to the second magnification.

11. The electronic device of claim 1, wherein the electronic device is further configured to execute the instructions to:
identify a situation where an input requesting a zoom change occurs continuously, and
move, when a requested time for the zoom change exceeded a preset threshold, the lens included in the second camera to the starting position.

12. The electronic device of claim 1,
wherein the preset first position comprises a position at an intermediate point of the movable range of the lens between a minimum magnification point of the movable range of the lens and a maximum magnification point of the movable range of the lens.

13. A method of controlling a camera and performing a zoom function for an electronic device, the method comprising:
displaying a first preview image of a first magnification acquired through a first camera through the display in response to an execution of a function related to the first camera;
moving, while the first preview image of the first magnification is displayed, a lens included in a second camera from a starting position to a preset first position configured based on a movable range of the lens;
moving, in response to an input requesting a zoom function to a second magnification, the lens of the preset first position to a second position corresponding to the second magnification; and
acquiring a second preview image corresponding to the second magnification through the second camera based on the lens moved to the second position,
wherein a first time required for the lens to move from the preset first position to the second position is shorter than a second time required for the lens to move from the starting position to the second position.

14. The method of claim 13, further comprising:
identifying whether the second magnification is included in a range of magnifications supported by the second camera in response to a signal requesting a zoom function to the second magnification;
moving the lens included in the second camera to the second position corresponding to the second magnification when the second magnification is included in a magnification of a certain range; and
maintaining the lens included in the second camera in the preset first position when the second magnification is not included in a scale of a certain range.

15. The method of claim 14, further comprising:
enlarging at least a portion of the first preview image by the second magnification and displaying the first preview image in response to the input requesting a zoom function to the second magnification; and
moving the lens included in the second camera to the second position corresponding to the second magnification when a predetermined time is exceeded from a time of displaying the first preview image enlarged to the second magnification.

16. The method of claim 15, further comprising:
changing the first preview image enlarged to the second magnification to the second preview image corresponding to the second magnification;
displaying the second preview image through the display;
changing the second preview image to the first preview image enlarged to the second magnification and displaying the first preview image in response to the input requesting a zoom function to the first magnification in a state where the second preview image corresponding to the second magnification is displayed; and
reducing the first preview image enlarged to the second magnification by the first magnification and displaying the first preview image.

17. The method of claim 16, further comprising moving the lens included in the second camera disposed at the second position to the preset first position in response to the input requesting the zoom function to the first magnification in a state where the second preview image corresponding to the second magnification is displayed.

18. The method of claim 17, further comprising:
enlarging the second preview image by a third magnification and displaying the second preview image in response to the input requesting the zoom function to the third magnification in a state where the second preview image corresponding to the second magnification acquired through the second camera is displayed;
acquiring a third preview image corresponding to the third magnification using a third camera supporting a zoom function corresponding to the third magnification; and
changing the second preview image enlarged by the third magnification to the third preview image and displaying the second preview image.

19. The method of claim 13,
wherein the first camera comprises a focal length fixed camera which has a fixed focal length and acquires an image corresponding to the first magnification,
wherein the second camera comprises a continuous optical zoom camera in which at least one lens physically moves and which acquires an image corresponding to a certain range of magnification, and
wherein the at least one lens comprises at least one of a zoom lens performing a zoom function corresponding to a specific magnification or an AF (auto focus) lens corresponding to a specific magnification based on a disposition position of the zoom lens.

20. At least one non-transitory computer-readable storage medium storing one or more programs including instructions, which when executed by a processor of an electronic device, cause the electronic device to perform a method of:
in response to an execution of a function related to a first camera, displaying a first preview image of a first magnification acquired through the first camera through a display;
moving, while the first preview image of the first magnification is displayed, a lens included in a second camera from a starting position to a preset first position configured based on a range of magnifications in which the lens can be moved;
moving, in response to an input requesting a zoom function to a second magnification, the lens of the preset first position to a second position corresponding to the second magnification; and
acquiring a second preview image corresponding to the second magnification through the second camera,
wherein a first time required for the lens to move from the preset first position to the second position is shorter than a second time required for the lens to move from the starting position to the second position.

* * * * *